(12) United States Patent
Raghavan et al.

(10) Patent No.: US 12,633,989 B2
(45) Date of Patent: May 19, 2026

(54) TECHNIQUES FOR TRANSFORMATION OF ANALOG BEAMFORMING CODEBOOKS

(71) Applicant: QUALCOMM Incorporated, San Diego, CA (US)

(72) Inventors: Vasanthan Raghavan, West Windsor Township, NJ (US); Raghu Narayan Challa, San Diego, CA (US); Mihir Vijay Laghate, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 283 days.

(21) Appl. No.: 17/477,319

(22) Filed: Sep. 16, 2021

(65) Prior Publication Data

US 2022/0094414 A1 Mar. 24, 2022

Related U.S. Application Data

(60) Provisional application No. 63/080,466, filed on Sep. 18, 2020.

(51) Int. Cl.
    *H04B 7/06* (2006.01)
    *H04B 17/345* (2015.01)
    (Continued)

(52) U.S. Cl.
    CPC ......... *H04B 7/0639* (2013.01); *H04B 7/0696* (2023.05); *H04B 17/345* (2015.01); *H04L 5/0048* (2013.01); *H04L 25/021* (2013.01)

(58) Field of Classification Search
    None
    See application file for complete search history.

(56) References Cited

U.S. PATENT DOCUMENTS

| | | | |
|---|---|---|---|
| 10,530,434 B2* | 1/2020 | Zhao | H04B 7/0695 |
| 10,720,976 B2* | 7/2020 | Petersson | H04L 25/0204 |

(Continued)

FOREIGN PATENT DOCUMENTS

| | | |
|---|---|---|
| EP | 3413484 A1 | 12/2018 |

OTHER PUBLICATIONS

International Search Report and Written Opinion—PCT/US2021/050849—ISA/EPO—Dec. 22, 2021 (208215WO).

*Primary Examiner* — Luna Weissberger
(74) *Attorney, Agent, or Firm* — Holland & Hart LLP/Qualcomm Incorporated

(57) ABSTRACT

Methods, systems, and devices for wireless communications are described. A communication device, such as a user equipment (UE) and a base station, for example, an eNodeB (eNB), a next-generation NodeB or a giga-NodeB (either of which may be referred to as a gNB) may support techniques for transformation of analog beamforming codebooks. The communication device may modify an analog beamforming codebook based on a covariance matrix associated with interference and noise in a wireless communication system. For example, the communication device may rotate the analog beamforming codebook based on the estimated covariance matrix, or scale one or more beam weights associated with the analog beamforming codebook based on the estimated covariance matrix, or both. The communication device may thereby perform wireless communication with another communication device in the wireless communication system using the modified analog beamforming codebook.

30 Claims, 14 Drawing Sheets

(51) Int. Cl.
    *H04L 5/00*         (2006.01)
    *H04L 25/02*      (2006.01)

(56)           References Cited

U.S. PATENT DOCUMENTS

| | | | |
|---|---|---|---|
| 11,637,613 B1 * | 4/2023 | Learned | H04J 11/0036 |
| | | | 369/44.28 |
| 2011/0142149 A1 * | 6/2011 | Shin | H04L 25/0244 |
| | | | 375/295 |
| 2015/0358063 A1 * | 12/2015 | Farkas | H04B 7/024 |
| | | | 375/267 |
| 2018/0048363 A1 * | 2/2018 | Okuyama | H04B 7/0456 |
| 2019/0082331 A1 | 3/2019 | Raghavan et al. | |
| 2019/0109629 A1 * | 4/2019 | Park | H04B 7/0456 |
| 2019/0110281 A1 * | 4/2019 | Zhou | H04W 76/19 |
| 2019/0190569 A1 * | 6/2019 | Nayeb Nazar | H04B 7/0639 |
| 2019/0190574 A1 | 6/2019 | Chen et al. | |
| 2020/0195320 A1 | 6/2020 | Raghavan et al. | |
| 2021/0344397 A1 * | 11/2021 | Lee | H04B 7/02 |

* cited by examiner

510

515

520

505

500

Modifying an analog beamforming codebook based on a covariance matrix associated with interference and noise in a wireless communication system — 905

Performing the wireless communication with a second device in the wireless communication system using the modified analog beamforming codebook — 910

900

Determining an SINR based on measuring an interference and noise level from a group of devices

1005

Modifying an analog beamforming codebook based on the determined SINR satisfying a threshold

1010

Performing wireless communication with a second device in a wireless communication system using the modified analog beamforming codebook

1015

1000

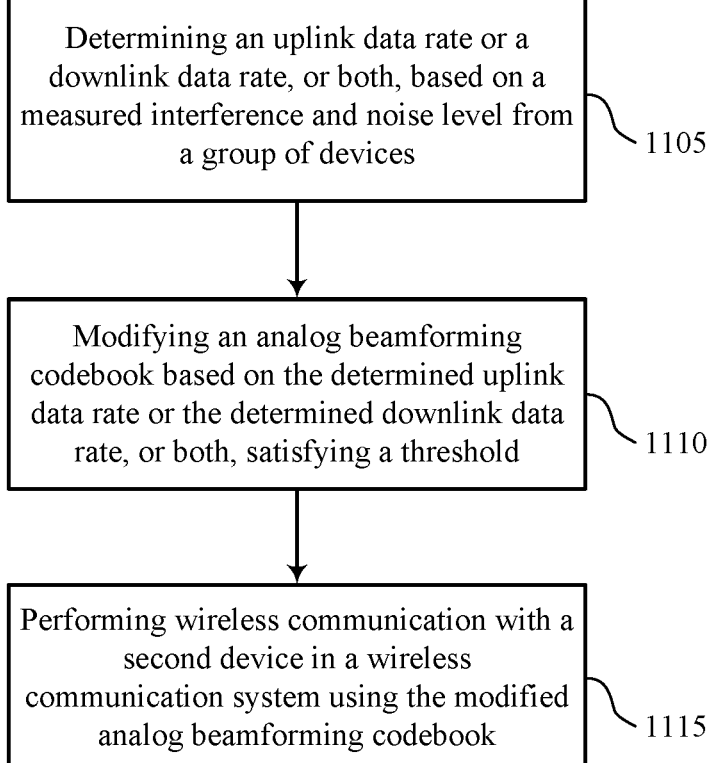

Determining an uplink data rate or a downlink data rate, or both, based on a measured interference and noise level from a group of devices

1105

Modifying an analog beamforming codebook based on the determined uplink data rate or the determined downlink data rate, or both, satisfying a threshold

1110

Performing wireless communication with a second device in a wireless communication system using the modified analog beamforming codebook

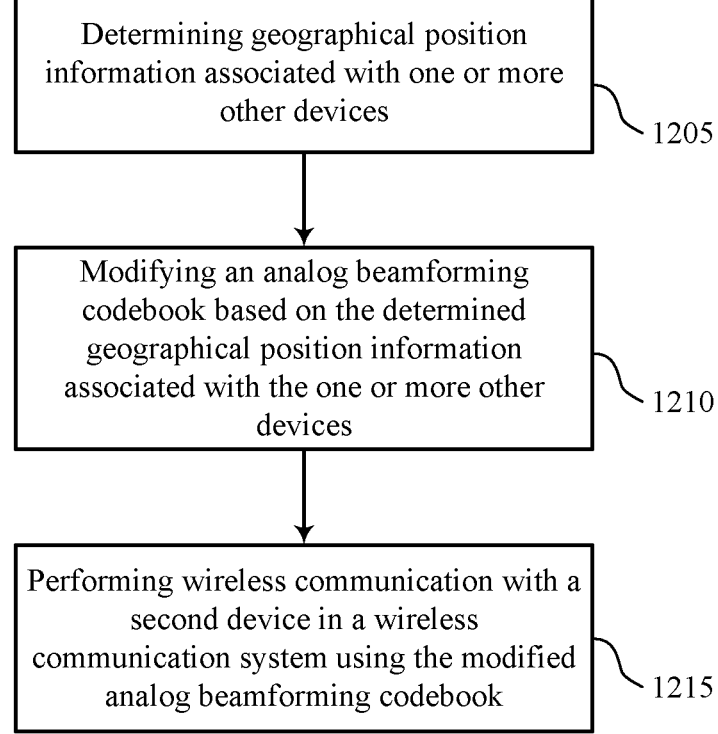

Determining geographical position information associated with one or more other devices

1205

Modifying an analog beamforming codebook based on the determined geographical position information associated with the one or more other devices

1210

Performing wireless communication with a second device in a wireless communication system using the modified analog beamforming codebook

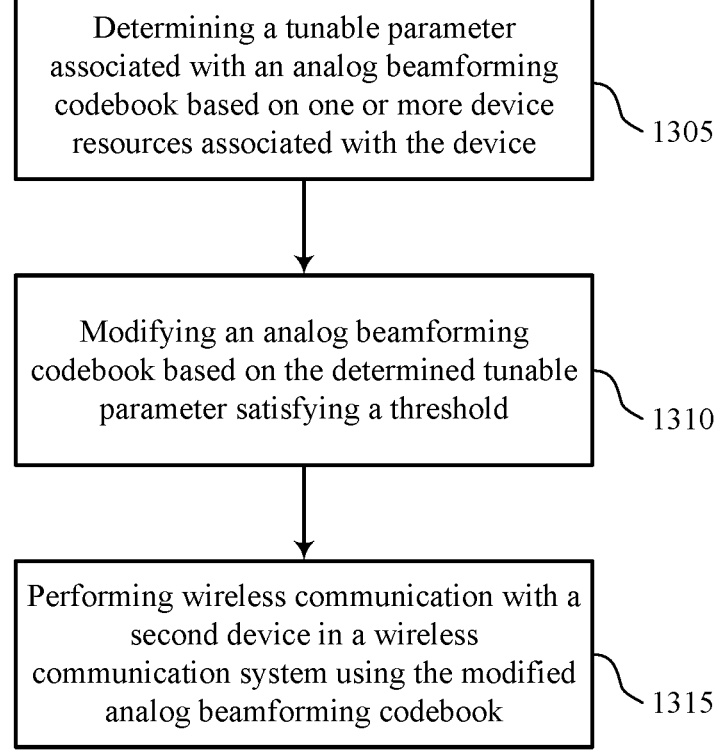

Determining a tunable parameter associated with an analog beamforming codebook based on one or more device resources associated with the device

1305

Modifying an analog beamforming codebook based on the determined tunable parameter satisfying a threshold

1310

Performing wireless communication with a second device in a wireless communication system using the modified analog beamforming codebook

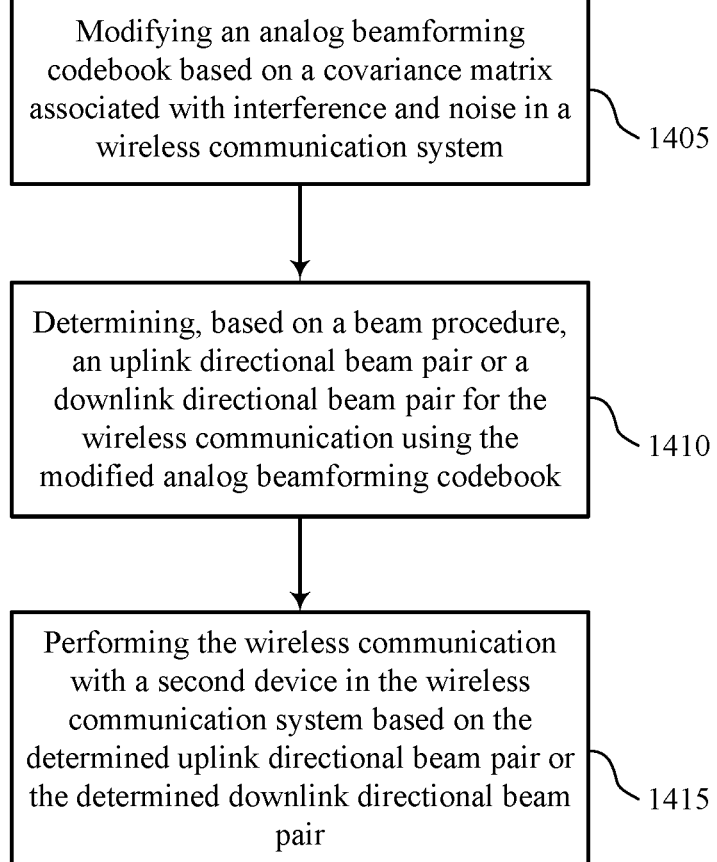

Modifying an analog beamforming codebook based on a covariance matrix associated with interference and noise in a wireless communication system    1405

Determining, based on a beam procedure, an uplink directional beam pair or a downlink directional beam pair for the wireless communication using the modified analog beamforming codebook    1410

Performing the wireless communication with a second device in the wireless communication system based on the determined uplink directional beam pair or the determined downlink directional beam pair    1415

TECHNIQUES FOR TRANSFORMATION OF ANALOG BEAMFORMING CODEBOOKS

CROSS REFERENCE

The present application for patent claims the benefit of U.S. Provisional Patent Application No. 63/080,466 by RAGHAVAN et al., entitled "TECHNIQUES FOR TRANS-FORMATION OF ANALOG BEAMFORMING CODE-BOOKS," filed Sep. 18, 2020, assigned to the assignee hereof, and which is hereby incorporated by reference in its entirety.

FIELD OF DISCLOSURE

The present disclosure, for example, relates to wireless communications systems, and more specifically to techniques for transformation of analog beamforming codebooks for wireless communications in the wireless communications systems.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

Various aspects of the present disclosure relate to configuring a communication device, such as a UE and a base station, for example, an eNodeB (eNB) or a gNB, in a wireless communications system to support techniques for transformation of analog beamforming codebooks. The communication device may transform (e.g., modify, adjust) an analog beamforming codebook based on an estimate of a covariance matrix associated with interference and noise in the wireless communications system. For example, the communication device may rotate the analog beamforming codebook based on the estimated covariance matrix, or scale one or more beam weights associated with the analog beamforming codebook based on the estimated covariance matrix, or both. The communication device may thereby perform wireless communication with another communication device in the wireless communications system using the modified analog beamforming codebook. By transforming the analog beamforming codebook, the communication device may experience power saving by promoting higher reliability and lower latency wireless communications, among other benefits.

A method of wireless communication at a first device in a wireless communication system is described. The method may include modifying an analog beamforming codebook based on a covariance matrix associated with interference and noise in the wireless communication system and performing the wireless communication with a second device in the wireless communication system using the modified analog beamforming codebook.

A first apparatus for wireless communication in a wireless communication system is described. The first apparatus may include a processor, memory coupled with the processor, and instructions stored in the memory. The instructions may be executable by the processor to cause the first apparatus to modify an analog beamforming codebook based on a covariance matrix associated with interference and noise in the wireless communication system and perform the wireless communication with a second apparatus in the wireless communication system using the modified analog beamforming codebook.

Another first apparatus for wireless communication in a wireless communication system is described. The first apparatus may include means for modifying an analog beamforming codebook based on a covariance matrix associated with interference and noise in the wireless communication system and means for performing the wireless communication with a second apparatus in the wireless communication system using the modified analog beamforming codebook.

A non-transitory computer-readable medium storing code for wireless communication at a first device in a wireless communication system is described. The code may include instructions executable by a processor to modify an analog beamforming codebook based on a covariance matrix associated with interference and noise in the wireless communication system and perform the wireless communication with a second device in the wireless communication system using the modified analog beamforming codebook.

Some examples of the method, apparatuses, and non-transitory computer-readable medium described herein may further include operations, features, means, or instructions for estimating the covariance matrix based on a set of resources, where modifying the analog beamforming codebook includes modifying the analog beamforming codebook based on the estimated covariance matrix.

Some examples of the method, apparatuses, and non-transitory computer-readable medium described herein may further include operations, features, means, or instructions for determining the set of resources based on a configuration, where estimating the covariance matrix includes estimating the covariance matrix based on measuring an interference and noise level due to simultaneous wireless communications from a group of devices including a third device using the determined set of resources.

In some examples of the method, apparatuses, and non-transitory computer-readable medium described herein, modifying the analog beamforming codebook may include operations, features, means, or instructions for rotating the analog beamforming codebook based on the estimated covariance matrix.

In some examples of the method, apparatuses, and non-transitory computer-readable medium described herein, modifying the analog beamforming codebook may include operations, features, means, or instructions for scaling one or more beam weights associated with the analog beam-forming codebook based on the estimated covariance matrix.

Some examples of the method, apparatuses, and non-transitory computer-readable medium described herein may further include operations, features, means, or instructions for determining a condition to modify the analog beamforming codebook, where modifying the analog beamforming codebook may be based on the determined condition.

In some examples of the method, apparatuses, and non-transitory computer-readable medium described herein, determining the condition may include operations, features, means, or instructions for determining a signal-to-interference-plus-noise-ratio (SINR) based on measuring an interference and noise level from a group of devices including a third device, where modifying the analog beamforming codebook may be based on the determined SINR satisfying a threshold.

In some examples of the method, apparatuses, and non-transitory computer-readable medium described herein, determining the condition may include operations, features, means, or instructions for determining an uplink data rate or a downlink data rate, or both, based on measuring an interference and noise level from a group of devices including a third device, where modifying the analog beamforming codebook may be based on the determined uplink data rate or the determined downlink data rate, or both, satisfying a threshold.

In some examples of the method, apparatuses, and non-transitory computer-readable medium described herein, determining the condition may include operations, features, means, or instructions for determining geographical position information associated with one or more other devices, where modifying the analog beamforming codebook may be based on the determined geographical position information associated with the one or more other devices.

In some examples of the method, apparatuses, and non-transitory computer-readable medium described herein, determining the condition may include operations, features, means, or instructions for determining a tunable parameter associated with the analog beamforming codebook based on one or more device resources associated with the first device, where modifying the analog beamforming codebook may be based on the determined tunable parameter satisfying a threshold.

Some examples of the method, apparatuses, and non-transitory computer-readable medium described herein may further include operations, features, means, or instructions for storing or loading the modified analog beamforming codebook in a memory of a radio-frequency integrated circuit of the first device.

Some examples of the method, apparatuses, and non-transitory computer-readable medium described herein may further include operations, features, means, or instructions for determining, based on a beam operation, an uplink directional beam pair or a downlink directional beam pair for the wireless communication using the modified analog beamforming codebook, where performing the wireless communication includes performing the wireless communication with the second device in the wireless communication system based on the determined uplink directional beam pair or the determined downlink directional beam pair.

Some examples of the method, apparatuses, and non-transitory computer-readable medium described herein may further include operations, features, means, or instructions for determining, based on a beam operation, an uplink directional beam pair or a downlink directional beam pair for the wireless communication using the modified analog beamforming codebook, where the uplink directional beam pair is different from the downlink directional beam pair, and where performing the wireless communication includes performing the wireless communication with the second device in the wireless communication system based on the determined uplink directional beam pair or the determined downlink directional beam pair.

Some examples of the method, apparatuses, and non-transitory computer-readable medium described herein may further include operations, features, means, or instructions for determining a channel quality between the first device and the second device based at last in part on one or more reference signals, where determining the uplink directional beam pair or the downlink directional beam pair includes determining, based on the determined channel quality, the uplink directional beam pair or the downlink directional beam pair for the wireless communication using the modified analog beamforming codebook.

Some examples of the method, apparatuses, and non-transitory computer-readable medium described herein may further include operations, features, means, or instructions for determining a channel quality between the first device and the second device based at last in part on one or more reference signals, where the one or more reference signals comprises a synchronization signal block (SSB), a channel state information reference signal (CSI-RS), or a sounding reference signal (SRS), or a combination thereof, where determining the uplink directional beam pair or the downlink directional beam pair includes determining, based on the determined channel quality, the uplink directional beam pair or the downlink directional beam pair for the wireless communication using the modified analog beamforming codebook.

In some examples of the method, apparatuses, and non-transitory computer-readable medium described herein, the one or more reference signals includes an SSB, a CSI-RS, or an SRS, or a combination thereof.

In some examples of the method, apparatuses, and non-transitory computer-readable medium described herein, the uplink directional beam pair may be different from the downlink directional beam pair.

Some examples of the method, apparatuses, and non-transitory computer-readable medium described herein may further include operations, features, means, or instructions for determining an uplink directional beam pair or a downlink directional beam pair for the wireless communication using the modified analog beamforming codebook based on a rate improvement parameter, a power consumption parameter, a computational complexity and a thermal overhead associated with transforming operations, one or more latencies and overheads incurred in separate beam training for uplink and downlink, or a combination thereof.

In some examples of the method, apparatuses, and non-transitory computer-readable medium described herein, performing the wireless communication may include operations, features, means, or instructions for performing the wireless communication with the second device in the wireless communication system based on signaling including an indication of an uplink directional beam pair or a downlink directional beam pair, or both.

In some examples of the method, apparatuses, and non-transitory computer-readable medium described herein, the signaling includes a radio resource control (RRC) message.

In some examples of the method, apparatuses, and non-transitory computer-readable medium described herein, the signaling includes a downlink control information (DCI) message.

In some examples of the method, apparatuses, and non-transitory computer-readable medium described herein, the signaling includes a medium access control-control element (MAC-CE) message.

In some examples of the method, apparatuses, and non-transitory computer-readable medium described herein, performing the wireless communication may include operations, features, means, or instructions for performing the wireless communication with the second device in the wireless communication system based on signaling including an indication of an uplink directional beam pair or a downlink directional beam pair, or both, where the signaling includes a RRC message, a DCI message, or a MAC-CE message, or a combination thereof.

In some examples of the method, apparatuses, and non-transitory computer-readable medium described herein, the first device or the second device, or both, include a UE, a customer premises equipment (CPE), a base station, a relay device, a repeater device with a capability corresponding to how messages may be repeated at the device, or a transmission-reception point, or a combination thereof.

BRIEF DESCRIPTION OF THE DRAWINGS

FIGS. 9 through 14 show flowcharts illustrating methods that support techniques for transformation of analog beamforming codebooks in accordance with various aspects of the present disclosure.

DETAILED DESCRIPTION

Figure 1:
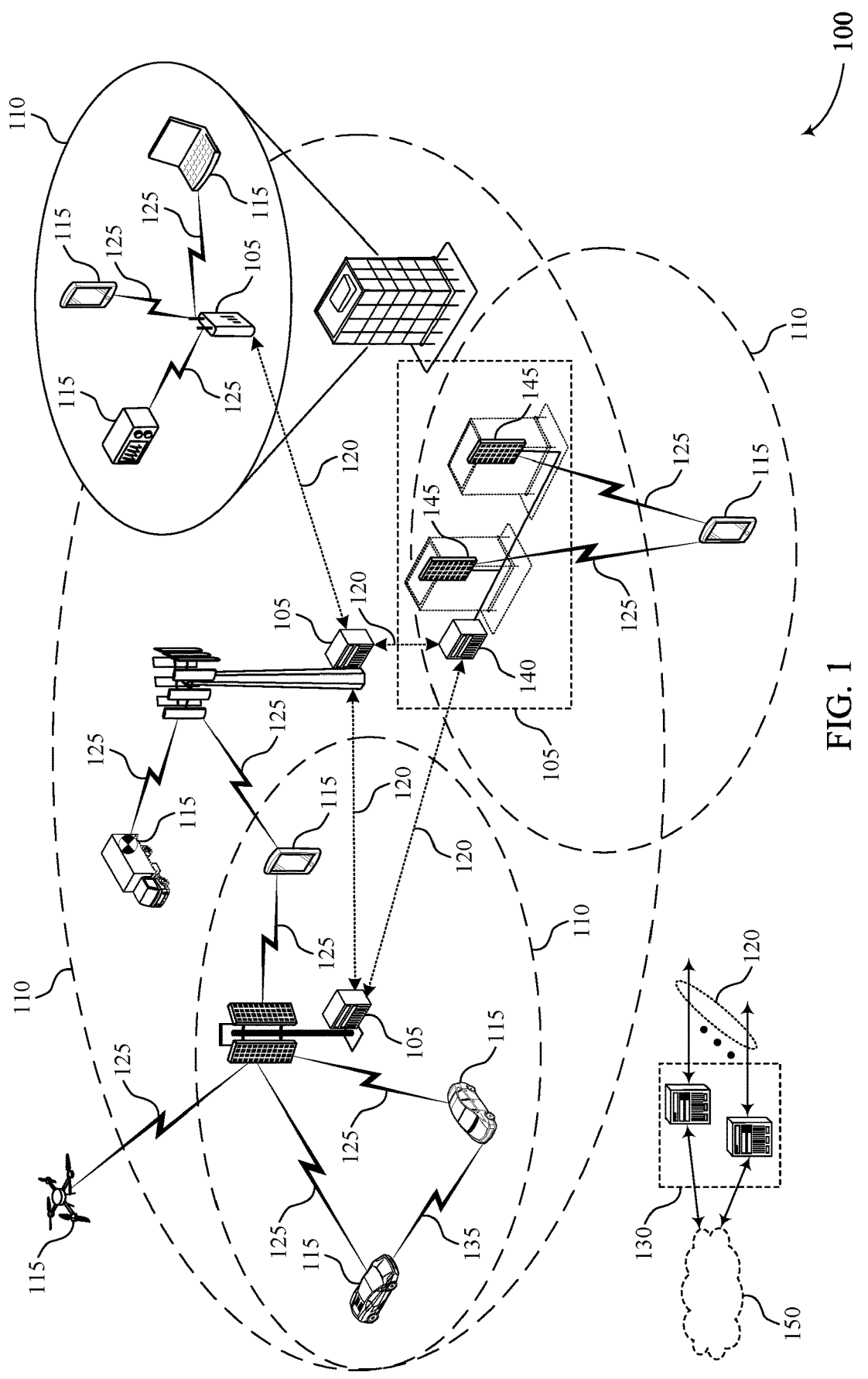
FIGS. 1 and 2 illustrate examples of wireless communications systems that support techniques for transformation of analog beamforming codebooks in accordance with various aspects of the present disclosure.

A wireless communications system may include communication devices, such as a UE and a base station (e.g., an eNB, a gNB, or some other base station), that support wireless communications over one or multiple radio access technologies. Examples of radio access technologies include 4G systems, such as LTE systems, and 5G systems, which may be referred to as NR systems. In the wireless communications system, the UE and the base station may support directional communications (also referred to as beamforming communications). The UE and the base station may use an analog beamforming codebook to support the directional communications. For example, the UE and the base station may use an analog beamforming codebook for millimeter wave (mmW) or sub-terahertz wireless communications to form multiple high peak-gain beams to compensate for high pathloss at mmW bands (e.g., frequencies greater than 24.25 GHz (e.g., in a 26 GHz band) in a frequency range 2 (FR2) band). In some examples, the UE and the base station may use an analog beamforming codebook for mmW or sub-terahertz wireless communications to form multiple high peak-gain beams to compensate for high pathloss in frequency range 4 (FR4) (52.6 GHz to 114.25 GHz) or frequency range 5 (FR5) (e.g., above 114.25 GHz). In some cases, the UE and the base station may experience interference, which may negatively impact the directional beams used for beamforming communications.

Various aspects of the present disclosure relate to configuring the UE and the base station to support techniques for transformation of analog beamforming codebooks. The UE and the base station may transform (e.g., modify, adjust) an analog beamforming codebook based on an estimate of a covariance matrix associated with interference and noise in the wireless communications system. For example, the UE and the base station may rotate their respective analog beamforming codebooks based on the estimated covariance matrices, or scale one or more beam weights associated with the analog beamforming codebooks based on the estimated covariance matrices, or both. The UE and the base station may thereby communicate using the modified analog beamforming codebooks.

Aspects of the subject matter described in the present disclosure may be implemented to realize one or more of the following potential improvements, among others. The present disclosure may provide benefits and enhancements to the operation of the communication device. For example, operations performed by the communication devices may provide improvements to directional communications. In some examples, configuring the communication device to support techniques for transforming an analog beamforming codebook may support improvements to power consumption, spectral efficiency, and, in some examples, may promote higher reliability and lower latency for directional downlink and uplink communications, among other benefits.

Aspects of the present disclosure are initially described in the context of wireless communications systems. Aspects of the present disclosure are further illustrated by and described with reference to apparatus diagrams, system diagrams, and flowcharts that relate to techniques for transformation of analog beamforming codebooks.

FIG. 1 illustrates an example of a wireless communications system 100 that supports techniques for transformation of analog beamforming codebooks in accordance with various aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or an NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. One or more of the base stations 105 described herein may include or may be referred to by a person having ordinary skill in the art as a base transceiver station, a radio base station, an access point, a radio transceiver, a NodeB, eNB, a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1. The UEs 115 and the base stations 105 may be a CPE, a relay device, a repeater device with a capability corresponding to a number of messages repeated at the device, or a transmission-reception point, or a combination thereof.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

A carrier may also have acquisition signaling or control signaling that coordinates operations for other carriers. A carrier may be associated with a frequency channel (e.g., an evolved universal mobile telecommunications system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode). A carrier may be associated with a bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs. The time intervals for the base stations 105 or the UEs 115 may be expressed in multiples of a basic time unit which may, for example, refer to a sampling period of $T_s=1/(\Delta f_{max}\cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or radio frequency spectrum band of operation. A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) radio frequency spectrum bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers. In some examples, a carrier may support multiple cells, and different cells may be configured according to different protocol types (e.g., MTC, narrowband IoT (NB-IoT), enhanced mobile broadband (eMBB)) that may provide access for different types of devices.

A base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

A UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more radio frequency spectrum bands, in the range of 300 megahertz (MHz) to 300 gigahertz (GHz). The region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using radio frequency spectrum bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support mmW communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), unlicensed radio frequency spectrum band radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with an orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105. Some signals, such as data signals associated with a receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

Some mmW wireless communications systems may be used for small-cell coverage with dense deployments (e.g., inter-site distance (ISD) of 50-100 meters in urban setting). These dense deployments may lead to more UEs 115 served per base station 105, and result in unavoidable interference at least for some UEs 115. Other examples where interference may occur include stadium, shopping mall, indoor office, downtown settings, etc. In some examples, coexistence of Wi-Fi signals in FR4-1 (e.g., 52.6-71 GHz) is likely to increase in-band interference. To improve use of analog beamforming codebooks to mitigate or reduce the interference, the base stations 105 and the UEs 115 may support techniques for transformation of analog beamforming codebooks as described herein.

For example, the base stations 105 and the UEs 115 may be configured to adapt an analog beamforming codebook based on an estimate of a covariance matrix of interference and noise experienced at the base stations 105 and the UEs 115. In some examples, the base stations 105 and the UEs 115 may be configured to adapt the analog beamforming codebook based on a channel condition. For example, the base stations 105 and the UEs 115 may adapt the analog beamforming codebook based on an SINR threshold, a downlink data rate, an uplink data rate, a block error rate (BLER), etc. Alternatively, or additionally, the base stations 105 and the UEs 115 may be configured to adapt the analog beamforming codebook based on resource condition. For example, the base stations 105 and the UEs 115 may adapt the analog beamforming codebook based on how often the analog beamforming codebook can be changed by the base stations 105 and the UEs 115 (e.g., bus speed, power, computational complexity in rotation and scaling, thermal condition, etc.). The base stations 105 and the UEs 115 may determine a beam pair based on the modified analog beamforming codebook and coordinate the use of separate beam pairs for uplink and downlink communications with other base stations 105 and UEs 115.

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Figure 2:
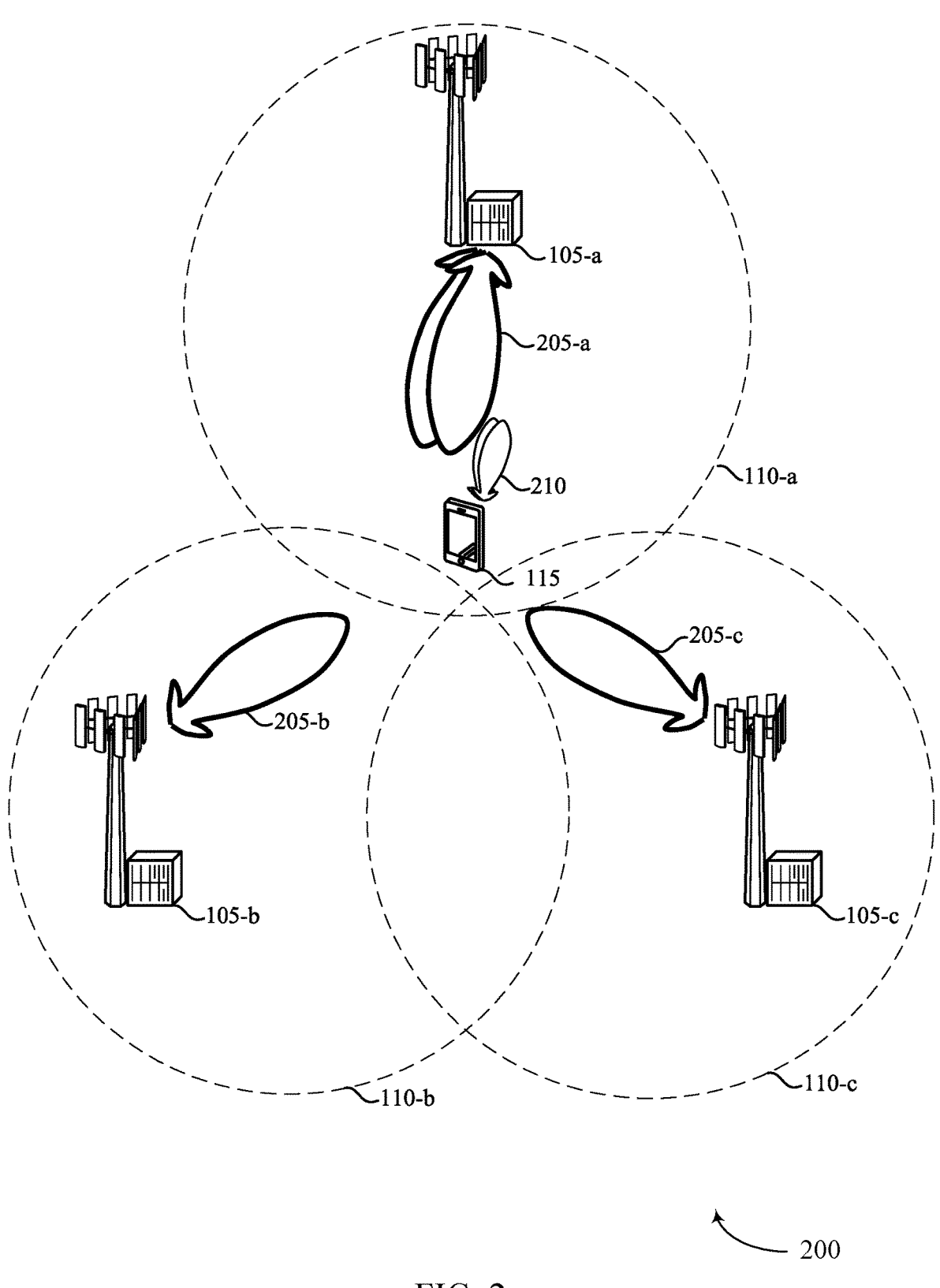

FIG. 2 illustrates an example of a wireless communications system 200 that supports techniques for transformation of analog beamforming codebooks in accordance with various aspects of the present disclosure. In some examples, the wireless communications system 200 may implement aspects of the wireless communications system 100. For example, the wireless communications system 200 may include a UE 115 and multiple base stations 105, such as a base station 105-a, a base station 105-b, and a base station 105-c which may be examples of the corresponding devices described with reference to FIG. 1. The wireless communications system 200 may support multiple radio access technologies including 4G systems such as LTE systems, LTE-A systems, or LTE-A Pro systems, and 5G systems, which may be referred to as NR systems.

The base station 105-a and the UE 115 may be configured with multiple antennas, which may be used to employ techniques such as transmit diversity, receive diversity, multiple-input multiple-output communications, or beamforming, or any combination thereof. The antennas of the base station 105-*a* and the UE 115 may be located within one or more antenna arrays or antenna panels, which may support multiple-input multiple-output operations or transmit or receive beamforming. For example, the base station 105-*a* antennas or antenna arrays may be co-located at an antenna assembly, such as an antenna tower. In some examples, antennas or antenna arrays associated with the base station 105-*a* may be located in diverse geographic locations. The base station 105-*a* may have an antenna array with a number of rows and columns of antenna ports that the base station 105-*a* may use to support beamforming of communications with the UE 115. Likewise, the UE 115 may have one or more antenna arrays that may support various multiple-input multiple-output or beamforming operations. Additionally, or alternatively, an antenna panel may support radio frequency beamforming for a signal transmitted via one or more antenna ports. The base station 105-*a* and the UE 115 may thus be configured to support directional communications (e.g., beamformed communications) using the multiple antennas.

The base station 105-*a* and the UE 115 may communicate via directional communications using one or more downlink beam pairs and one or more uplink beam pairs. For example, the base station 105-*a* may support downlink communications with the UE 115 using a downlink beam associated with a downlink beam pair 205-*a*, while the UE 115 may support uplink communications with the base station 105-*a* using an uplink beam pair 210. In some examples, the base station 105-*a* and the UE 115 may communicate via directional communications using multiple component carriers, such as mmW radio frequency carriers. For example, the base station 105-*a* and the UE 115 may be configured to support multiple downlink component carriers and multiple uplink component carriers. The base station 105-*a* and the UE 115 may be configured to support directional communications over a carrier bandwidth or may be configured to support the directional communications over one of multiple carrier bandwidths.

In the example of FIG. 2, the base station 105-*a* and the UE 115 may support directional communications using an analog beamforming codebook (e.g., a multi-panel type codebook, a linear combination type codebook, a port selection type codebook, and the like). The base station 105-*a* and the UE 115 may support various operations to support the directional communications, for example, initial acquisition operations, beam refinement operations, beam failure recovery operations, beam management operations, etc. The base station 105-*a* and the UE 115 may use an analog beamforming codebook to perform these various operations to support the directional communications. Thus, use of analog beamforming codebooks by the base station 105-*a* and the UE 115 may support initial acquisition operations, beam refinement operations, beam failure recovery operations, beam management operations, etc.

In some cases, there may be other factors that impact directional communications between the base station 105-*a* and the UE 115, which may be difficult to resolve using some analog beamforming codebooks (e.g., baseline analog beamforming codebooks) due to these analog beamforming codebooks having a directional configuration. That is, a small number of clusters in a channel relative to a number of antenna elements might lead to focus on directional schemes instead of more complex eigen-space based schemes. For example, the UE 115 may experience interference from the base station 105-*b* (due to downlink transmission on a downlink beam pair 205-*b*) or the base station 105-*c* (due to downlink transmission on a downlink beam pair 205-*c*), or both, which may negatively impact one or more uplink directional beams of the uplink beam pair 210 used by the UE 115 for mmW communications with the base station 105-*a*. It therefore may be desirable to improve use of codebooks preconfigured at the base station 105-*a* or the UE 115, or both, to mitigate or reduce the interference.

The base station 105-*a* and the UE 115 may be configured to support analog beamforming codebooks. In some examples, based on an $N_r \times N_t$ (where $N_r$ is a number of antennas at the receiver side and $N_r$ is a number of antennas at the transmitter side) channel matrix over a single polarization and L clusters, the channel matrix between the base station 105-*a* and the UE 115 may be based on the following Equations (1)-(7), $$H = \sum_{l=1}^{L} \alpha_l \cdot u_l v_l^H \tag{1}$$

where $u_l$ is an array steering vector at a receiving device (e.g., the UE 115) along an azimuth angle of arrival (AoA)/zenith angle of arrival (ZoA) and $v_l$ is an array steering vector at a transmitter device (e.g., the base station 105-*a*) along the azimuth angle of departure (AoD)/zenith angle of departure (ZoD). Equation (2) outlines a system equation for receiving a symbol vector s:

$$\hat{s} = G^H HFs + G^H n \tag{2}$$

where n is CN(0, $\Sigma_n$) and s is r×1 with a distribution given as CN(0, $I_r$). Equations (3) and (4) outline maximizing an achievable rate under perfect channel state information (CSI) assumptions.

$$F_{opt} = UD_{opt}, \text{ where } H^H \sum_n^{-1} H = UDU^H \tag{3}$$

$$G_{opt} = \sum_n^{-1} H\, F_{opt} \cdot \left( I_r + F_{opt}^H H^H \sum_n^{-1} H\, F_{opt} \right)^{-1} \tag{4}$$

$$H^H \sum_n^{-1} H = \sum_{i,j} \alpha_i^* \alpha_j \cdot \left( u_i^H \sum_n^{-1} u_j \right) \cdot v_i v_j^H = VAV^H \tag{5}$$

$$V\,|_{N_t \times L} = [\alpha_1^* v_1, \dots, \alpha_L^* v_L] \text{ and } A\,|_{L \times L} \text{ with } A(i,j) = u_i^H \sum_n^{-1} u_j \tag{6}$$

In some examples, X may be L-by-L eigenvector matrix of $AV^H V$ with corresponding diagonal matrix of eigenvalues denoted by $\Lambda$. That is, the eigenvalue equation is given as ($AV^H V)X = X\Lambda$). By pre-multiplying by V, the following Equation (7) is obtained.

$$V(AV^H V)X = (VAV^H)VX = VX\Lambda \tag{7}$$

In other words, VX is the eigenvector matrix of $$VAV^H = H^H \sum_n^{-1} H.$$

Thus, all eigenvectors of $$H^H \sum_n^{-1} H$$

are the column vector of VX and are thus linear combinations of [$v_1, \dots, v_L$]. An analog beamforming codebook search operation at the base station 105-*a* can thus be optimally reduced to search over the set of array steering vectors seen at the base station 105-*a*. However, the UE 115 may be configured to support analog beamforming codebooks based on the following Equations (8)-(10), $$G_{opt} = \sum_n^{-1} HF_{opt} \cdot \left(I_r + F_{opt}^H H^H \sum_n^{-1} HF_{opt}\right)^{-1} \tag{8}$$

$$G_{opt} = \sum_{l=1}^{L} \sum_n^{-1} u_l \cdot \left(\alpha \cdot v_l^H U \hat{D}\right) \tag{9}$$

$$G_{opt} = \left[\sum_n^{-1} u_1, \ldots, \sum_n^{-1} u_L\right] \cdot \begin{bmatrix} \alpha_1 \cdot v_1^H U \hat{D} \\ \vdots \\ \alpha_L \cdot v_L^H U \hat{D} \end{bmatrix} \tag{10}$$

where $$D = D_{opt} \cdot \left(I_r + D_{opt}^H D D_{opt}\right)^{-1}.$$

In other words, all the columns of $G_{opt}$ can be represented as linear combinations of $$\left\{\sum_n^{-1} u_l, \ldots, \sum_n^{-1} u_L\right\}.$$

If $\Sigma_n=I$ or, if the interference is white Gaussian, an analog beamforming codebook search at the UE 115 may be seen to be reduced to search over the set of array steering vectors seen at the UE 115. In some cases, this is how analog beamforming is performed (either by not incorporating $\Sigma_n$ or by treating it as I). If $\Sigma_n \neq I$, then the analog beamforming codebook corresponding to the UE 115 may have to be transformed (e.g., rotated and scaled) by $$\sum_n^{-1}.$$

This observation may be in line with digital beamforming using a linear minimum mean squared error (LMMSE) receiver where whitening is performed with noise covariance matrix estimate (also denoted as $R_{nn}$). In some cases, this may be in line with rotation of analog beamforming codebooks for spatially correlated channels.

To improve use of analog beamforming codebooks to mitigate or reduce the interference, the base station 105-a and the UE 115 may support techniques for transformation of analog beamforming codebooks. By way of example, the UE 115 may estimate a covariance matrix (e.g., $\Sigma_n$) associated with interference and noise in the wireless communications system 200. For example, the UE 115 may be in wireless communication with the base station 105-a, but may experience interference from the base station 105-b or the base station 105-c, or both, while in wireless communication (e.g., downlink reception, uplink transmission) with the base station 105-a. In some examples, the UE 115 may estimate the covariance matrix associated with interference and noise over one or more time and frequency resources. For example, the UE 115 may estimate the covariance matrix associated with interference and noise over a number of resource elements.

A resource element may include at least one time resource and one frequency resource, for example, at least one subcarrier during one symbol period (e.g., Orthogonal Frequency Division Multiplexing (OFDM) symbol). The UE 115 may be preconfigured to estimate covariance matrix over one or more time and frequency resources. That is, the one or more time and frequency resources may be preconfigured semi-statically or dynamically, or both. In some examples, the base station 105-a may preconfigure the UE 115, via an RRC message during an RRC procedure, to use one or more time and frequency resources for covariance matrix estimation. In some other examples, the base station 105-a may preconfigure the UE 115, via a MAC-CE message or a DCI message, to use one or more time and frequency resources for covariance matrix estimation.

The UE 115 may modify an analog beamforming codebook based on the estimated covariance matrix. Transformation (e.g., modification) of an analog beamforming codebook may also be performed by the base station 105-a. In some examples, the UE 115 may rotate the analog beamforming codebook based on the estimated covariance matrix. For example, the UE 115 may rotate one or more beams by rotating a beam direction or a beam orientation, or both, by a rotating factor, which may be preconfigured. In some other examples, the UE 115 may scale one or more beam weights associated with the analog beamforming codebook based on the estimated covariance matrix. For example, the UE 115 may scale the one or more beam weights by a scaling factor, which may be preconfigured. The UE 115 may store or load, or both, the modified analog beamforming codebook into memory of the radio-frequency integrated circuit associated with the UE 115 to use for wireless communication with the base station 105-a.

The UE 115 may, in some examples, be configured to modify the analog beamforming codebook using the estimated covariance matrix based on one or more conditions (also referred to as trigger conditions). In some examples, the UE 115 may determine a signal-to-noise ratio (SNR), an SINR, a signal-to-interference ratio (SIR), or any combination thereof, based on measuring an interference and noise level from a group of devices in the wireless communications system 200. For example, the UE 115 may be in wireless communication with the base station 105-a in a geographic coverage area 110-a (e.g., a serving cell), and the UE 115 may determine an SNR, an SINR, an SIR, or a combination thereof, based on measuring an interference and noise level from one or more other base stations 105 associated with one or more neighboring geographic coverage areas 110-b, 110-c (e.g., neighboring cells). The UE 115 may thereby modify the analog beamforming codebook using the estimated covariance matrix based on the determined SNR, SINR, or SIR satisfying a threshold. For example, the UE 115 may modify the analog beamforming codebook when the determined SNR, SINR, or SIR is above a threshold.

In some other examples, the UE 115 may determine an uplink data rate or a downlink data rate, or both, based on measuring an interference and noise level from a group of devices in the wireless communications system 200. For example, the UE 115 may be in wireless communication with the base station 105-a in the geographic coverage area 110-a (e.g., the serving cell), and the UE 115 may determine a data rate (e.g., data throughput), based on measuring an interference and noise level from one or more other base stations 105-b, 105-c associated with the neighboring geographic coverage areas 110-b, 110-c (e.g., neighboring cells), or other UEs or mmW nodes. The UE 115 may thereby modify the analog beamforming codebook using the estimated covariance matrix based on the determined data rate satisfying a threshold. For example, the UE 115 may modify the analog beamforming codebook when the determined data rate is below a threshold, so that the UE 115 may increase data throughput between the UE 115 and the base station 105-*a*.

In other examples, the UE 115 may determine a deployment of one or more other devices in the wireless communications system 200 (e.g., an indoor office, a stadium, a shopping mall, etc.). The UE 115 may thereby modify the analog beamforming codebook using the estimated covariance matrix based on the deployment of the one or more other devices. In some other examples, the UE 115 may determine a tunable parameter associated with the analog beamforming codebook based on one or more device resources associated with the UE 115. That is, the UE 115 may determine how often the analog beamforming codebook can be modified, for example, based on radio-frequency integrated circuit resources associated with the UE 115 (e.g., a bus speed, a power level, a thermal level, computational complexity in rotation and scaling), etc. The UE 115 may thus modify the analog beamforming codebook based on the determined tunable parameter satisfying a threshold.

In some cases, $\Sigma_n$ seen at the base station 105-*a* in an uplink setting has no correlation with the $\Sigma_n$ seen at the UE 115 in a downlink setting, as the aggressor nodes are different (e.g., the base stations 105-*b*, 105-*c* for the UE 115 are different than those for the base station 105-*a*). In some cases, use of covariance matrices at both the base station 105-*a* and the UE 115 may lead to breakdown of beam correspondence. The breakdown in beam correspondence may lead to an increase in beam training latencies, power, thermal and associated costs (e.g., separate beam training phase for uplink and downlink), and increase in system complexity (e.g., beam failure recovery, handover, radio link maintenance, etc.). The base station 105-*a* and the UE 115 may determine whether to use covariance matrices (e.g., to obtain better analog beamforming codebooks and hence better performance) based on a latencies, power, thermal, computational complexity and performance improvements. For FR2, the wireless communications system 200 may not experience high interference. Then, the base station 105-*a* and the UE 115 may assume $\Sigma_n$=I, which leads to reciprocal uplink and downlink beam training. However, when either downlink or uplink, or both, experience strong interference, the base station 105-*a* or the UE 115, or both, might have to use transformed analog beamforming codebooks. To address this, the base station 105-*a* and the UE 115 may support signaling to coordinate use of separate directional beam pairs for uplink and downlink communications.

The base station 105-*a* and the UE 115 may coordinate use of separate beam pairs for uplink and downlink communications. The UE 115 may determine, based on a beam procedure (e.g., a beam training procedure), the uplink beam pair 210 for the wireless communication using the modified analog beamforming codebook. In some examples, the UE 115 may determine a channel quality between the UE 115 and the base station 105-*a* based on one or more reference signals. For example, the base station 105-*a* may transmit a SSB, a CSI-RS, or a SRS, or a combination thereof, and the UE 115 may determine the channel quality between the UE 115 and the base station 105-*a* based on one or more of these reference signals. Additionally or alternatively, the UE 115 may determine the uplink beam pair 210 based on a rate improvement parameter, a power consumption parameter, a computational complexity and a thermal overhead associated with transforming operations, one or more latencies and overheads incurred in separate beam training for uplink and downlink, or a combination thereof. The UE 115 may signal (e.g., via an uplink message) the uplink directional beam pair to the base station 105-*a*. Likewise, the base station 105-*a* may determine the downlink beam pair 205-*a* for wireless communication with the UE 115. In some cases, the uplink directional beam pair is different from the downlink directional beam pair. In some other cases, the uplink directional beam pair and the downlink directional beam pair are the same.

Therefore, in the wireless communications system 200, the base station 105-*a* or the UE 115, or both, may experience power savings by transforming the analog beamforming codebook. The base station 105-*a* or the UE 115, or both, may experience higher reliability and lower latency wireless communications, among other benefits, by transforming the analog beamforming codebook.

Figure 3:
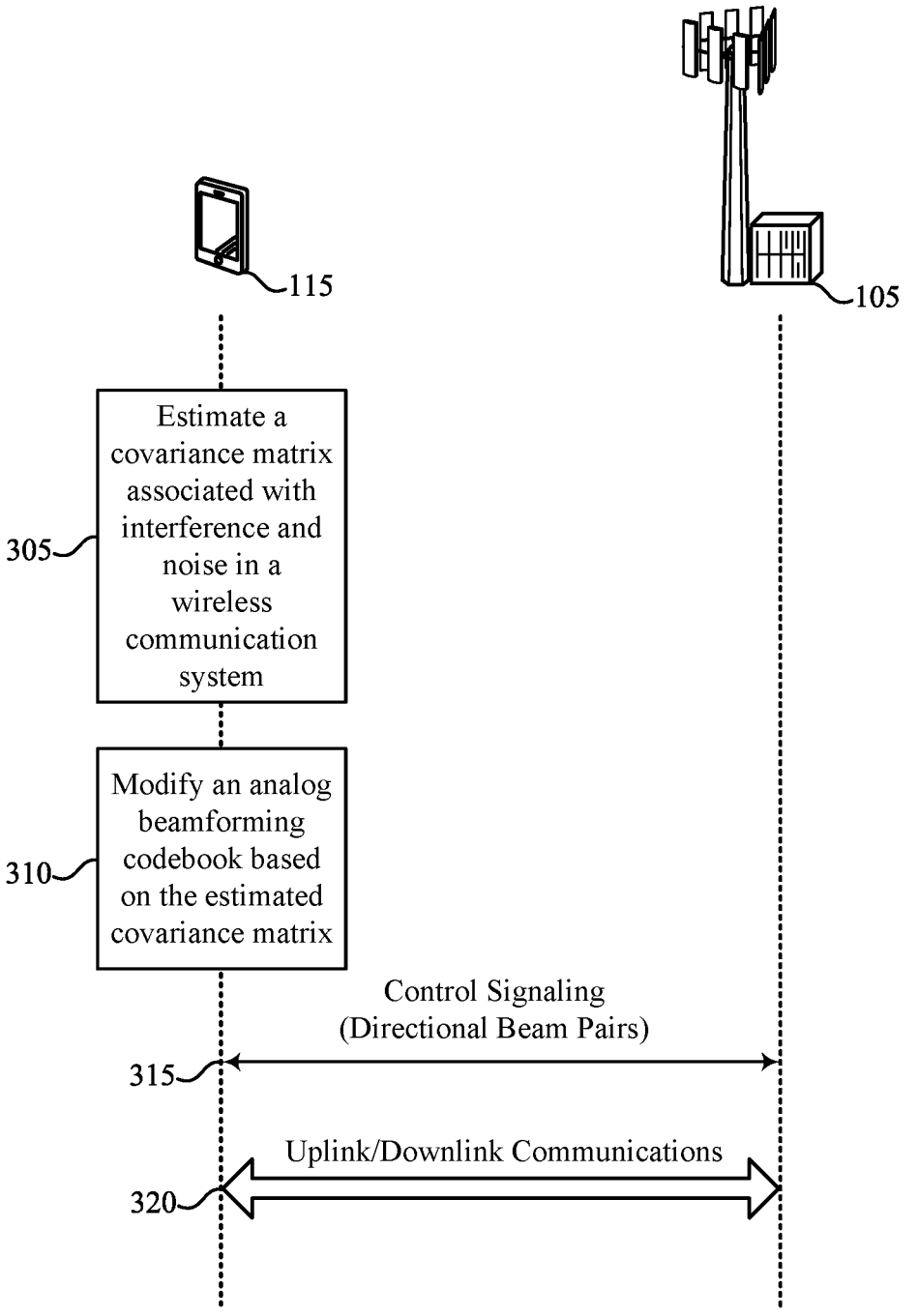
FIGS. 3 and 4 illustrate examples of process flows that support techniques for transformation of analog beamforming codebooks in accordance with various aspects of the present disclosure.

FIG. 3 illustrates an example of a process flow 300 that supports techniques for transformation of analog beamforming codebooks in accordance with various aspects of the present disclosure. The process flow 300 may implement aspects of the wireless communications system 100 and the wireless communications system 200 described with reference to FIGS. 1 and 2, respectively. The process flow 300 may be based on a configuration by a base station 105 and implemented by a UE 115 (e.g., in a downlink setting) to experience power saving for the UE 115 by transforming an analog beamforming codebook used for directional communications (e.g., beamforming communications) with the base station 105. The process flow 300 may also be based on a configuration by the base station 105 and implemented by the UE 115 to promote high reliability and low latency directional communications (e.g., uplink transmission, downlink reception), among other benefits.

In the following description of the process flow 300, the operations between the base station 105 and the UE 115 may be transmitted in a different order than the example order shown, or the operations performed by the base station 105 and the UE 115 may be performed in different orders or at different times. Some operations may also be omitted from the process flow 300, and other operations may be added to the process flow 300. The base station 105 and the UE 115 may be examples of a base station 105 and a UE 115 as described with reference to FIGS. 1 and 2, respectively.

At 305, the UE 115 may estimate a covariance matrix associated with interference and noise in a wireless communications system, as described with reference to FIGS. 1 and 2, respectively. For example, the UE 115 may be in wireless communication with the base station 105, but may experience interference from one or more other devices (e.g., base stations 105, UEs 115) in the wireless communications system while in wireless communication (e.g., downlink reception, uplink transmission) with the base station 105. In some examples, the UE 115 may estimate the covariance matrix associated with interference and noise over one or more time and frequency resources. At 310, the UE 115 may modify an analog beamforming codebook based on the estimated covariance matrix. In some examples, the UE 115 may rotate the analog beamforming codebook based on the estimated covariance matrix. In some other examples, the UE 115 may scale one or more beam weights associated with the analog beamforming codebook based on the estimated covariance matrix.

The UE 115 may, in some examples, be configured to modify the analog beamforming codebook using the estimated covariance matrix based on one or more conditions (also referred to as trigger conditions). In some examples, the UE 115 may determine an SINR based on measuring an interference and noise level from a group of devices in the wireless communications system. For example, the UE 115 may be in wireless communication with the base station 105 in a serving cell, and the UE 115 may determine an SINR based on measuring an interference and noise level from one or more other base stations 105 in one or more other neighboring cells. The UE 115 may thereby modify the analog beamforming codebook using the estimated covariance matrix based on the determined SINR satisfying an SINR threshold. For example, the UE 115 may modify the analog beamforming codebook when the determined SINR is above an SINR threshold.

In some other examples, the UE 115 may determine an uplink data rate or a downlink data rate, or both, based on measuring an interference and noise level from a group of devices in the wireless communications system. For example, the UE 115 may be in wireless communication with the base station 105 in a serving cell, and the UE 115 may determine a data rate, based on measuring an interference and noise level from one or more other base stations 105 in one or more other neighboring cells. The UE 115 may thereby modify the analog beamforming codebook using the estimated covariance matrix based on the determined data rate satisfying a threshold. For example, the UE 115 may modify the analog beamforming codebook when the determined data rate is below a threshold, so that the UE 115 may increase data throughput between the UE 115 and the base station 105 in wireless communication with the UE 115.

In other examples, the UE 115 may determine a deployment of one or more other devices in the wireless communications system (e.g., an indoor office, a stadium, a shopping mall, etc.). For example, the UE 115 may determine geographical position information associated with the one or more other devices to reduce an interference and noise level impact on the UE 115. The UE 115 may thereby modify the analog beamforming codebook using the estimated covariance matrix based on the deployment of the one or more other devices. For instance, the UE 115 may modify the analog beamforming codebook based on the one or more other devices being within a threshold distance (i.e., proximate) from the UE 115. In some other examples, the UE 115 may determine a tunable parameter associated with the analog beamforming codebook based on one or more device resources associated with the UE 115. That is, the UE 115 may determine how often the analog beamforming codebook can be modified, for example, based on radio-frequency integrated circuit resources associated with the UE 115 (e.g., a bus speed, a power level, computational complexity in rotation), etc. The UE 115 may thus modify the analog beamforming codebook based on the determined tunable parameter satisfying a threshold.

At 315, the base station 105 and the UE 115 may coordinate use of separate beam pairs for uplink and downlink communications. The UE 115 may determine, based on a beam procedure (e.g., a beam training procedure), an uplink directional beam pair for the wireless communication using the modified analog beamforming codebook. In some examples, the UE 115 may determine a channel quality between the UE 115 and the base station 105 based on one or more reference signals. For example, the base station 105 may transmit an SSB, a CSI-RS, or an SRS, or a combination thereof, and the UE 115 may determine the channel quality between the UE 115 and the base station 105 based on one or more of these reference signals. Additionally or alternatively, the UE 115 may determine an uplink directional beam pair based on a rate improvement parameter, a power consumption parameter, a computational complexity and a thermal overhead associated with transforming operations, one or more latencies and overheads incurred in separate beam training for uplink and downlink, or a combination thereof.

The UE 115 may signal (e.g., via an uplink message, such as an uplink control information (UCI) message) the uplink directional beam pair to the base station 105. Likewise, the base station 105 may determine a downlink directional beam pair for wireless communication with the UE 115. In some cases, the uplink directional beam pair is different from the downlink directional beam pair. In some other cases, the uplink directional beam pair and the downlink directional beam pair are the same. At 320, the base station 105 and the UE 115 may perform uplink and downlink communications. For example, the UE 115 may transmit uplink communications, or receive downlink communication from the base station 105, using the modified analog beamforming codebook. By transforming the analog beamforming codebook, the UE 115 may experience power saving by promoting higher reliability and lower latency wireless communications with the base station 105 due to reducing or mitigating interference from other devices (e.g., base stations 105, UEs 115).

Figure 4:
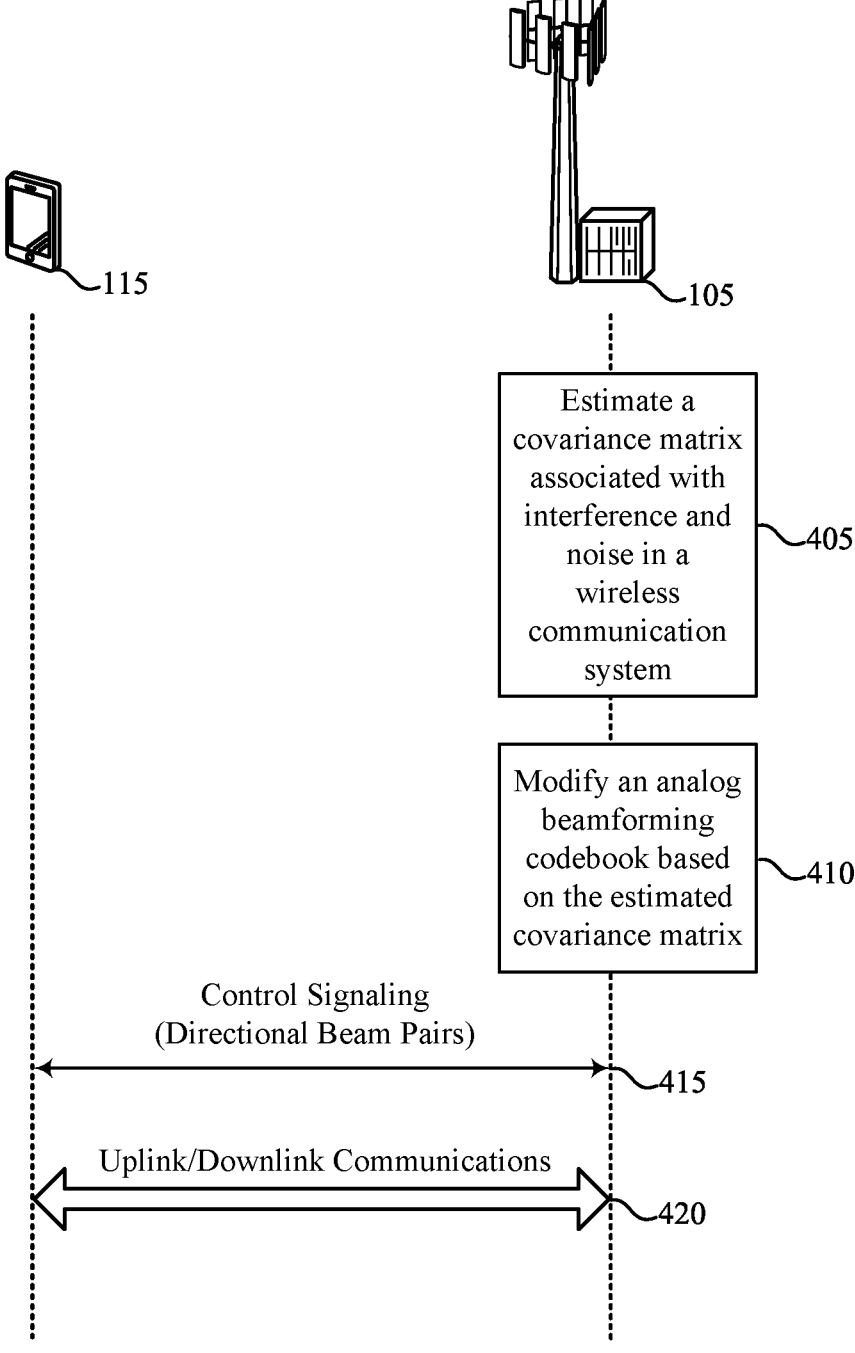

FIG. 4 illustrates an example of a process flow 400 that supports techniques for transformation of analog beamforming codebooks in accordance with various aspects of the present disclosure. The process flow 400 may implement aspects of the wireless communications system 100 and the wireless communications system 200 described with reference to FIGS. 1 and 2, respectively. The process flow 400 may be based on a configuration by a base station 105 and implemented by the base station 105 (e.g., in an uplink setting) to promote power saving for the base station 105 by transforming an analog beamforming codebook used for directional communications (e.g., beamforming communications) with a UE 115. The process flow 400 may also be based on a configuration by the base station 105 and implemented by the base station 105 to promote high reliability and low latency directional communications (e.g., uplink reception, downlink transmission), among other benefits.

In the following description of the process flow 400, the operations between the base station 105 and the UE 115 may be transmitted in a different order than the example order shown, or the operations performed by the base station 105 and the UE 115 may be performed in different orders or at different times. Some operations may also be omitted from the process flow 400, and other operations may be added to the process flow 400. The base station 105 and the UE 115 may be examples of a base station 105 and a UE 115 as described with reference to FIGS. 1 and 2, respectively.

At 405, the base station 105 may estimate a covariance matrix associated with interference and noise in a wireless communications system, as described with reference to FIGS. 1 and 2, respectively. In some examples, the base station 105 may estimate the covariance matrix associated with interference and noise over one or more time and frequency resources from one or more other devices (e.g., base stations 105, UEs 115) in the wireless communications system. For example, the base station 105 may estimate the covariance matrix associated with interference and noise over a number of resource elements, resource blocks, and the like, from one or more other devices in the wireless communications system.

At 410, the base station 105 may modify an analog beamforming codebook based on the estimated covariance matrix. In some examples, the base station 105 may rotate the analog beamforming codebook based on the estimated covariance matrix. For example, the base station 105 may rotate one or more beams by adjusting a beam direction or a beam orientation, or both, by a factor. In some other examples, the base station 105 may scale one or more beam weights associated with the analog beamforming codebook based on the estimated covariance matrix. For example, the base station 105 may scale the one or more beam weights by a scaling factor. The base station 105 may store or load, or both, the modified analog beamforming codebook into memory of the radio-frequency integrated circuit associated with the base station 105 to use for wireless communication with the UE 115. Similarly, the base station 105 may, in some examples, be configured to modify the analog beamforming codebook using the estimated covariance matrix based on one or more conditions (also referred to as trigger conditions), as described in FIGS. 1 through 3, respectively.

At 415, the base station 105 and the UE 115 may coordinate use of separate beam pairs for uplink and downlink communications. The base station 105 may determine, based on a beam procedure (e.g., a beam training procedure), a downlink directional beam pair for the wireless communication using the modified analog beamforming codebook. In some examples, the base station 105 may determine a channel quality between the UE 115 and the base station 105 based on a report (e.g., a CSI report) from the UE 115. Additionally or alternatively, the base station 105 may determine a downlink directional beam pair based on a rate improvement parameter, a power consumption parameter, a computational complexity and a thermal overhead associated with transforming operations, one or more latencies and overheads incurred in separate beam training for uplink and downlink, or a combination thereof.

The base station 105 may signal (e.g., via an RRC message, a DCI message, a MAC-CE message) the downlink directional beam pair to the UE 115. In some cases, the uplink directional beam pair is different from the downlink directional beam pair. In some other cases, the uplink directional beam pair and the downlink directional beam pair are the same. At 420, the base station 105 and the UE 115 may perform uplink and downlink communications. For example, the base station 105 may transmit downlink communications, or receive uplink communication from the UE 115, using the modified analog beamforming codebook. By transforming the analog beamforming codebook, the base station 105 may experience higher reliability and lower latency wireless communications with the UE 115 due to reducing or mitigating interference from other devices (e.g., base stations 105, UEs 115).

Figure 5:
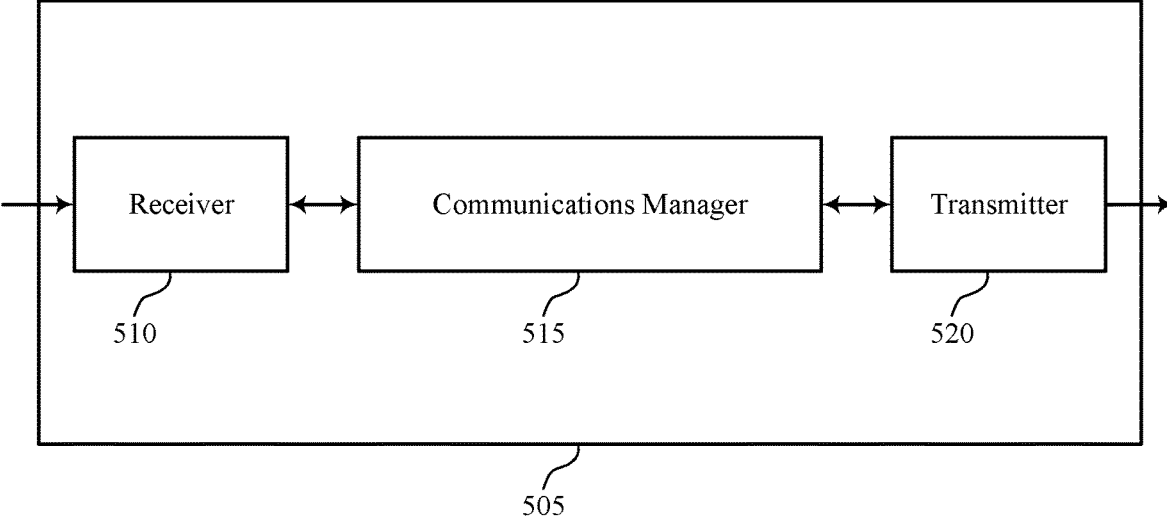
FIGS. 5 and 6 show block diagrams of devices that support techniques for transformation of analog beamforming codebooks in accordance with various aspects of the present disclosure.

FIG. 5 shows a block diagram 500 of a device 505 that supports techniques for transformation of analog beamforming codebooks in accordance with various aspects of the present disclosure. The device 505 may be an example of aspects of a device, such as a base station 105 and a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to techniques for transformation of analog beamforming codebooks, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may be implemented as an integrated circuit or chipset for the device 505, and the receiver 510 and the transmitter 520 may be implemented as analog components (for example, amplifiers, filters, antennas) coupled with the device 505 modem to enable wireless transmission and reception. The actions performed by the communications manager 515 as described herein may be implemented to realize one or more potential advantages. At least one implementation may enable the communications manager 515 to transform (e.g., modify, adjust) analog beamforming codebooks. For example, the device 505 may, via the communications manager 515, modify an analog beamforming codebook based on a covariance matrix associated with interference and noise in a wireless communications system, as described in FIGS. 1 and 2, respectively, and perform wireless communication with a second device in the wireless communications system using the modified analog beamforming codebook. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signaling processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver component. For example, the transmitter 520 may be an example of aspects of the transceiver 820 described with reference to FIG. 8. The transmitter 520 may utilize a single antenna or a set of antennas.

By including or configuring the communications manager 515 in accordance with examples as described herein, the device 505 (e.g., a processor controlling or otherwise coupled to the receiver 510, the communications manager 515, the transmitter 520, or a combination thereof) may support techniques for transformation of analog beamforming codebooks. Described techniques may result in improvements to power consumption, spectral efficiency, and, in some examples, may promote higher reliability and lower latency for directional downlink and uplink communications, among other benefits.

Figure 6:
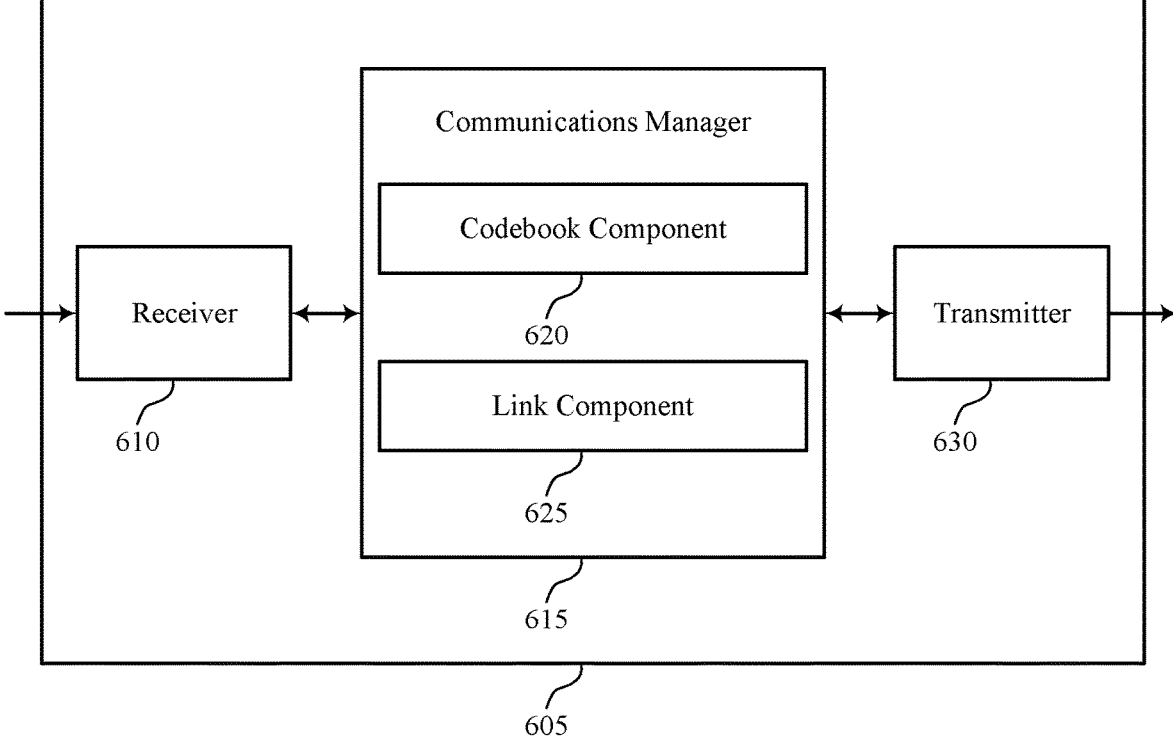

FIG. 6 shows a block diagram 600 of a device 605 that supports techniques for transformation of analog beamforming codebooks in accordance with various aspects of the present disclosure. The device 605 may be an example of aspects of a device 505, such as a base station 105 and a UE 115 as described herein. The device 605 may include a receiver 610, a communications manager 615, and a transmitter 630. The device 605 may also include a processor. Each of these components may be in communication with one another (e.g., via one or more buses).

The receiver 610 may receive information such as packets, user data, or control information associated with various information channels (e.g., control channels, data channels, and information related to techniques for transformation of analog beamforming codebooks, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a codebook component 620 and a link component 625. The communications manager 615 may be an example of aspects of the communications manager 810 described herein. The codebook component 620 may modify an analog beamforming codebook based on a covariance matrix associated with interference and noise in a wireless communications system. The link component 625 may perform wireless communication with a second device in the wireless communications system using the modified analog beamforming codebook.

The transmitter 630 may transmit signals generated by other components of the device 605. In some examples, the transmitter 630 may be collocated with a receiver 610 in a transceiver component. For example, the transmitter 630 may be an example of aspects of the transceiver 820 described with reference to FIG. 8. The transmitter 630 may utilize a single antenna or a set of antennas.

Figure 7:
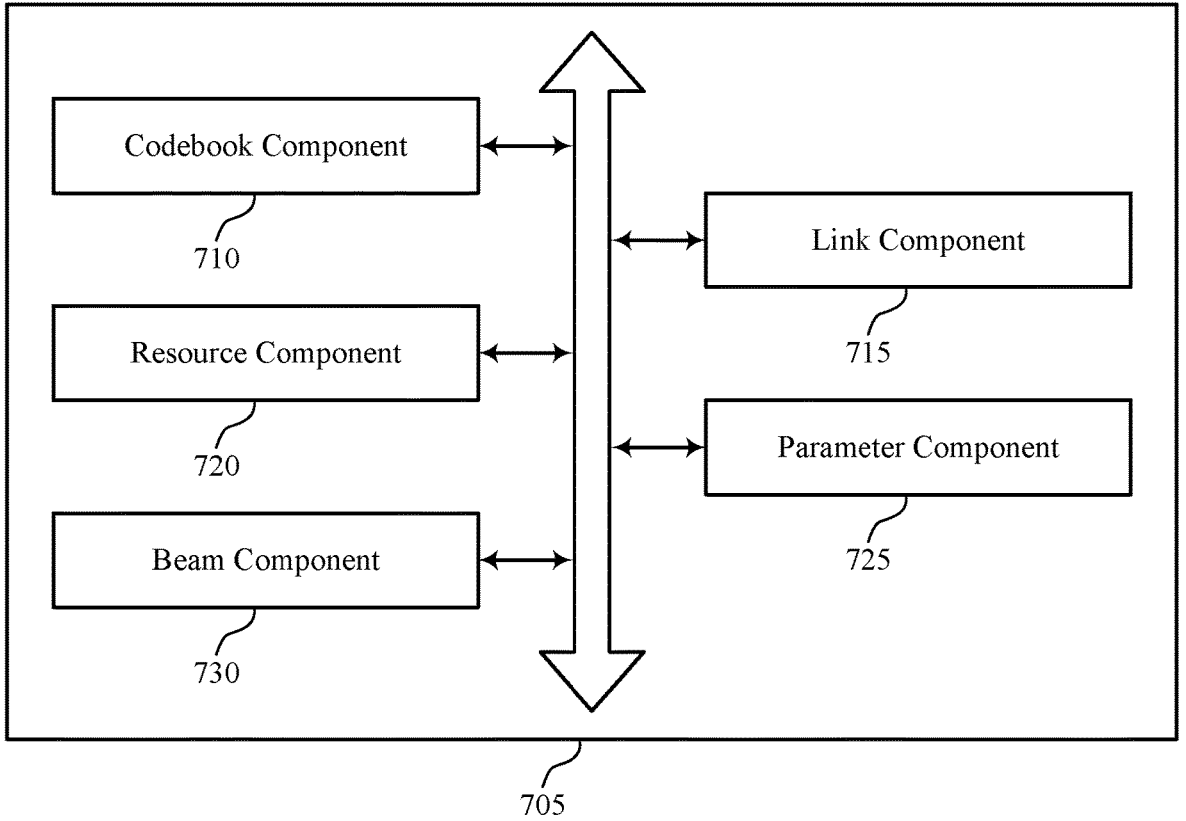
FIG. 7 shows a block diagram of a communications manager that supports techniques for transformation of analog beamforming codebooks in accordance with various aspects of the present disclosure.

FIG. 7 shows a block diagram 700 of a communications manager 705 that supports techniques for transformation of analog beamforming codebooks in accordance with various aspects of the present disclosure. The communications manager 705 may be an example of aspects of a communications manager 515, a communications manager 615, or a communications manager 810 described herein. The communications manager 705 may include a codebook component 710, a link component 715, a resource component 720, a parameter component 725, and a beam component 730. Each of these components may communicate, directly or indirectly, with one another (e.g., via one or more buses).

The codebook component 710 may modify an analog beamforming codebook based on a covariance matrix associated with interference and noise in a wireless communications system. In some examples, the codebook component 710 may rotate the analog beamforming codebook based on an estimated covariance matrix. In some examples, the codebook component 710 may scale one or more beam weights associated with the analog beamforming codebook based on the estimated covariance matrix. In some examples, the codebook component 710 may store or load the modified analog beamforming codebook in a memory of a radio-frequency integrated circuit. In some cases, a device (e.g., a first device or a second device, or both, as described herein) may include a UE, a CPE, a base station, a relay device, a repeater device with a capability corresponding to how messages are repeated at the device, or a transmission-reception point, or a combination thereof.

The link component 715 may perform wireless communication with a second device in the wireless communications system using the modified analog beamforming codebook. In some examples, the link component 715 may perform the wireless communication with the second device in the wireless communications system based on signaling including an indication of an uplink directional beam pair or a downlink directional beam pair, or both. In some cases, the signaling includes an RRC message. In some cases, the signaling includes a DCI message. In some cases, the signaling includes a MAC-CE message.

The resource component 720 may estimate the covariance matrix based on a set of resources, where modifying the analog beamforming codebook includes. In some examples, the resource component 720 may modify the analog beamforming codebook based on the estimated covariance matrix. In some examples, the resource component 720 may determine the set of resources based on a configuration. In some examples, the resource component 720 may estimate the covariance matrix based on measuring an interference and noise level due to simultaneous wireless communications from a group of devices including a third device using the determined set of resources.

The parameter component 725 may determine a condition to modify the analog beamforming codebook, where modifying the analog beamforming codebook is based on the determined condition. In some examples, the parameter component 725 may determine an SINR based on measuring an interference and noise level from a group of devices including a third device, where modifying the analog beamforming codebook is based on the determined SINR satisfying a threshold. In some examples, the parameter component 725 may determine an uplink data rate or a downlink data rate, or both, based on the measured interference and noise level from a group of devices including a third device, where modifying the analog beamforming codebook is based on the determined uplink data rate or the determined downlink data rate, or both, satisfying a threshold. In some examples, the parameter component 725 may determine geographical position information associated with one or more other devices, where modifying the analog beamforming codebook is based on the determined geographical position information associated with the one or more other devices. In some examples, the parameter component 725 may determine a tunable parameter associated with the analog beamforming codebook based on one or more device resources associated with the first device, where modifying the analog beamforming codebook is based on the determined tunable parameter satisfying a threshold.

The beam component 730 may determine, based on a beam procedure, an uplink directional beam pair or a downlink directional beam pair for the wireless communication using the modified analog beamforming codebook, where performing the wireless communication includes performing the wireless communication with the second device in the wireless communications system based on the determined uplink directional beam pair or the determined downlink directional beam pair. In some examples, the beam component 730 may determine a channel quality between the first device and the second device based at last in part on one or more reference signals, where determining the uplink directional beam pair or the downlink directional beam pair includes determining, based on the determined channel quality, the uplink directional beam pair or the downlink directional beam pair for the wireless communication using the modified analog beamforming codebook. In some examples, the beam component 730 may determine an uplink directional beam pair or a downlink directional beam pair for the wireless communication using the modified analog beamforming codebook based on a rate improvement parameter, a power consumption parameter, a computational complexity and a thermal overhead associated with transforming operations, one or more latencies and overheads incurred in separate beam training for uplink and downlink, or a combination thereof. In some cases, the one or more reference signals includes an SSB, a CSI-RS, or an SRS, or a combination thereof. In some cases, the uplink directional beam pair is different from the downlink directional beam pair.

Figure 8:
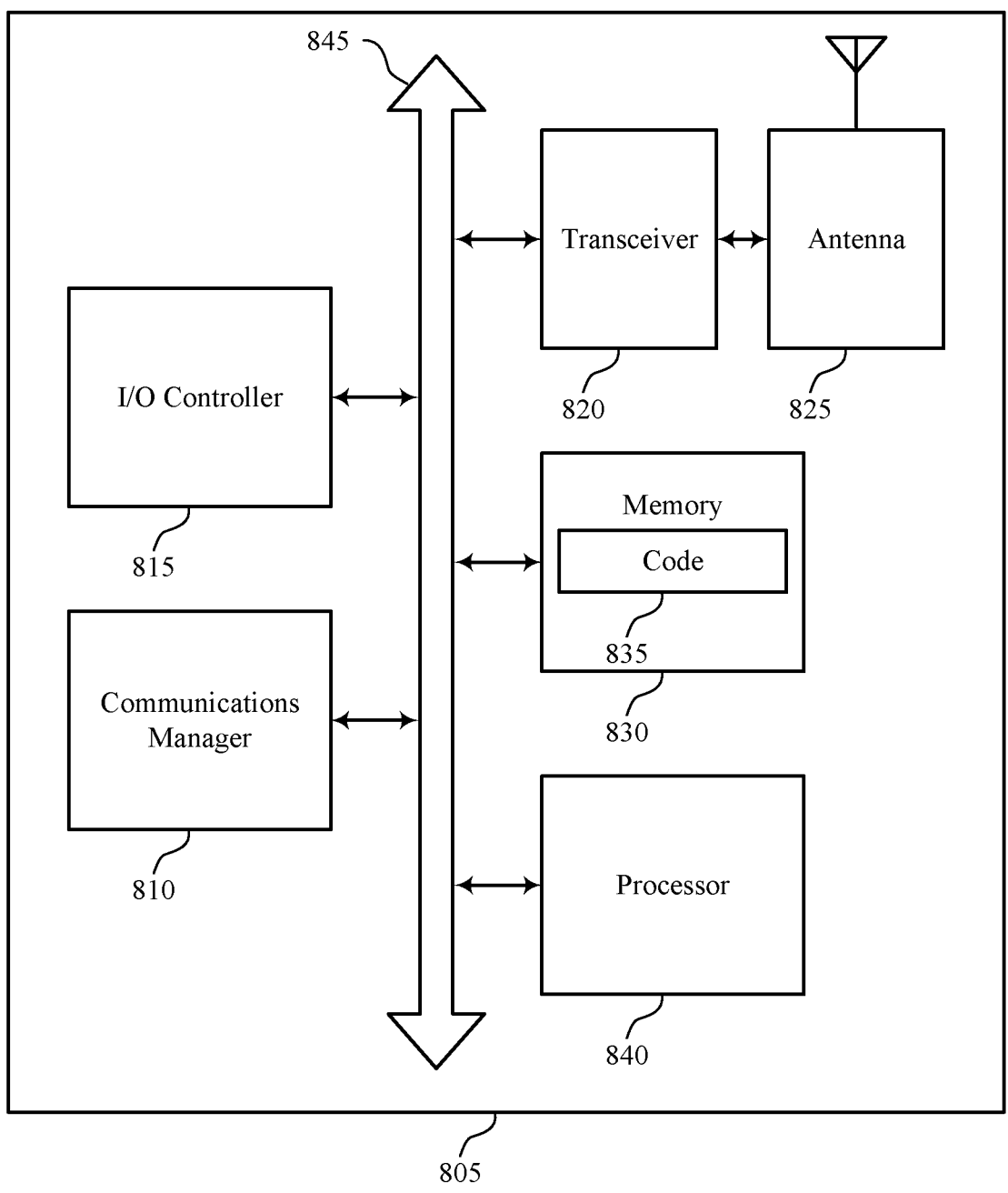
FIG. 8 shows a diagram of a system including a device that supports techniques for transformation of analog beamforming codebooks in accordance with various aspects of the present disclosure.

FIG. 8 shows a diagram of a system 800 including a device 805 that supports techniques for transformation of analog beamforming codebooks in accordance with various aspects of the present disclosure. The device 805 may be an example of or include the components of device 505, device 605, or a base station 105 and a UE 115 described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

At least one implementation may enable the communications manager 810 to support transforming analog beamforming codebooks. For example, the communications manager 810 may modify an analog beamforming codebook based on a covariance matrix associated with interference and noise in the wireless communications system and perform the wireless communication with a second device in the wireless communications system using the modified analog beamforming codebook. Based on implementing the transformation, one or more processors of the device 805 (for example, processor(s) controlling or incorporated with the communications manager 810) may promote improvements to power consumption, and, in some examples, may promote enhanced efficiency for high reliability and low latency wireless communications (e.g., downlink and uplink transmissions), among other benefits.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas. In some cases, the device 805 may include a single antenna 825. However, in some cases, the device 805 may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor 840 to perform various functions described herein. In some cases, the memory 830 may contain, among other things, a basic input/output system (BIOS) which may control basic hardware or software operation such as the interaction with peripheral components or devices.

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for transformation of analog beamforming codebooks).

By including or configuring the communications manager 810 in accordance with examples as described herein, the device 805 may support techniques for transformation of analog beamforming codebooks. Described techniques may result in improvements to power consumption, spectral efficiency, and, in some examples, may promote higher reliability and lower latency for directional downlink and uplink communications, among other benefits.

Figure 9:
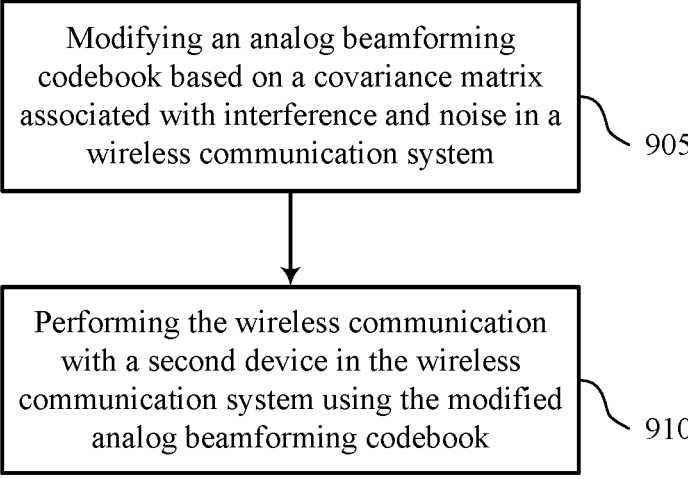

FIG. 9 shows a flowchart illustrating a method 900 that supports techniques for transformation of analog beamforming codebooks in accordance with various aspects of the present disclosure. The operations of method 900 may be implemented by a device (e.g., a base station 105, a UE 115) or its components as described herein. For example, the operations of method 900 may be performed by a communications manager as described with reference to FIGS. 5 through 8. In some examples, a device may execute a set of instructions to control the functional elements of the device to perform the functions described below. Additionally, or alternatively, a device may perform aspects of the functions described below using special-purpose hardware.

At 905, the device may modify an analog beamforming codebook based on a covariance matrix associated with interference and noise in a wireless communication system. The operations of 905 may be performed according to the methods described herein. In some examples, aspects of the operations of 905 may be performed by a codebook component as described with reference to FIGS. 5 through 8.

At 910, the device may perform the wireless communication with a second device in the wireless communication system using the modified analog beamforming codebook. The operations of 910 may be performed according to the methods described herein. In some examples, aspects of the operations of 910 may be performed by a link component as described with reference to FIGS. 5 through 8.

Figure 10:
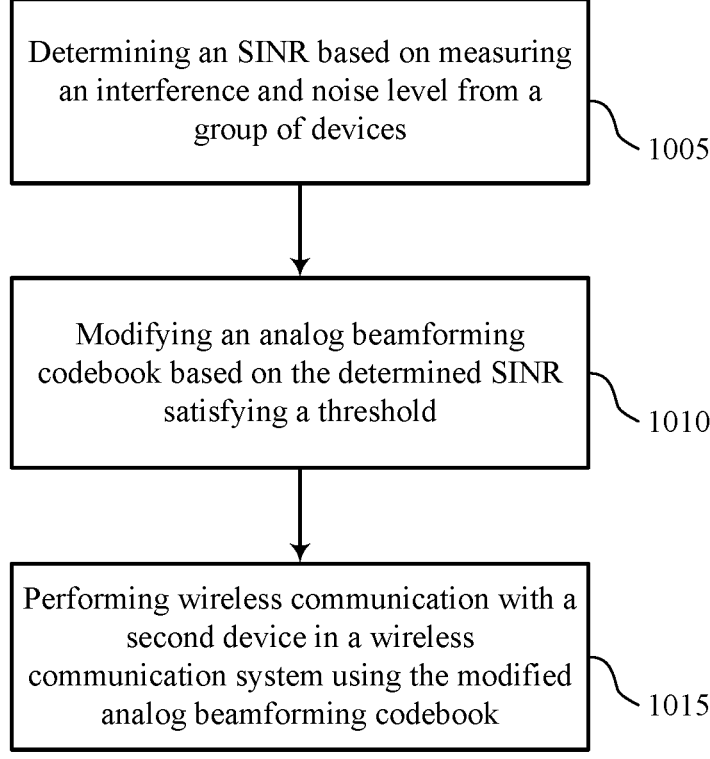

FIG. 10 shows a flowchart illustrating a method 1000 that supports techniques for transformation of analog beamforming codebooks in accordance with various aspects of the present disclosure. The operations of method 1000 may be implemented by a device (e.g., a base station 105, a UE 115) or its components as described herein. For example, the operations of method 1000 may be performed by a communications manager as described with reference to FIGS. 5 through 8. In some examples, a device may execute a set of instructions to control the functional elements of the device to perform the functions described below. Additionally, or alternatively, a device may perform aspects of the functions described below using special-purpose hardware.

At 1005, the device may determine an SINR based on measuring an interference and noise level from a group of devices. The operations of 1005 may be performed according to the methods described herein. In some examples, aspects of the operations of 1005 may be performed by a parameter component as described with reference to FIGS. 5 through 8.

At 1010, the device may modify an analog beamforming codebook based on the determined SINR satisfying a threshold. The operations of 1010 may be performed according to the methods described herein. In some examples, aspects of the operations of 1010 may be performed by a codebook component as described with reference to FIGS. 5 through 8.

At 1015, the device may perform wireless communication with a second device in a wireless communication system using the modified analog beamforming codebook. The operations of 1015 may be performed according to the methods described herein. In some examples, aspects of operations of 1015 may be performed by a link component as described with reference to FIGS. 5 through 8.

FIG. 11 shows a flowchart illustrating a method 1100 that supports techniques for transformation of analog beamforming codebooks in accordance with various aspects of the present disclosure. The operations of method 1100 may be implemented by a device (e.g., a base station 105, a UE 115) or its components as described herein. For example, the operations of method 1100 may be performed by a communications manager as described with reference to FIGS. 5 through 8. In some examples, a device may execute a set of instructions to control the functional elements of the device to perform the functions described below. Additionally, or alternatively, a device may perform aspects of the functions described below using special-purpose hardware.

At 1105, the device may determine an uplink data rate or a downlink data rate, or both, based on a measured interference and noise level from a group of devices. The operations of 1105 may be performed according to the methods described herein. In some examples, aspects of the operations of 1105 may be performed by a parameter component as described with reference to FIGS. 5 through 8.

At 1110, the device may modify an analog beamforming codebook based on the determined uplink data rate or the determined downlink data rate, or both, satisfying a threshold. The operations of 1110 may be performed according to the methods described herein. In some examples, aspects of the operations of 1110 may be performed by a codebook component as described with reference to FIGS. 5 through 8.

At 1115, the device may perform wireless communication with a second device in a wireless communication system using the modified analog beamforming codebook. The operations of 1115 may be performed according to the methods described herein. In some examples, aspects of the operations of 1115 may be performed by a link component as described with reference to FIGS. 5 through 8.

FIG. 12 shows a flowchart illustrating a method 1200 that supports techniques for transformation of analog beamforming codebooks in accordance with various aspects of the present disclosure. The operations of method 1200 may be implemented by a device (e.g., a base station 105, a UE 115) or its components as described herein. For example, the operations of method 1200 may be performed by a communications manager as described with reference to FIGS. 5 through 8. In some examples, a device may execute a set of instructions to control the functional elements of the device to perform the functions described below. Additionally, or alternatively, a device may perform aspects of the functions described below using special-purpose hardware.

At 1205, the device may determine geographical position information associated with one or more other devices. The operations of 1205 may be performed according to the methods described herein. In some examples, aspects of the operations of 1205 may be performed by a parameter component as described with reference to FIGS. 5 through 8.

At 1210, the device may modify an analog beamforming codebook based on the determined geographical position information associated with the one or more other devices. The operations of 1210 may be performed according to the methods described herein. In some examples, aspects of the operations of 1210 may be performed by a codebook component as described with reference to FIGS. 5 through 8.

At 1215, the device may perform wireless communication with a second device in a wireless communication system using the modified analog beamforming codebook. The operations of 1215 may be performed according to the methods described herein. In some examples, aspects of the operations of 1215 may be performed by a link component as described with reference to FIGS. 5 through 8.

FIG. 13 shows a flowchart illustrating a method 1300 that supports techniques for transformation of analog beamforming codebooks in accordance with various aspects of the present disclosure. The operations of method 1300 may be implemented by a device (e.g., a base station 105, a UE 115) or its components as described herein. For example, the operations of method 1300 may be performed by a communications manager as described with reference to FIGS. 5 through 8. In some examples, a device may execute a set of instructions to control the functional elements of the device to perform the functions described below. Additionally, or alternatively, a device may perform aspects of the functions described below using special-purpose hardware.

At 1305, the device may determine a tunable parameter associated with an analog beamforming codebook based on one or more device resources associated with the device. The operations of 1305 may be performed according to the methods described herein. In some examples, aspects of the operations of 1305 may be performed by a parameter component as described with reference to FIGS. 5 through 8.

At 1310, the device may modify an analog beamforming codebook based on the determined tunable parameter satisfying a threshold. The operations of 1310 may be performed according to the methods described herein. In some examples, aspects of the operations of 1310 may be performed by a codebook component as described with reference to FIGS. 5 through 8.

At 1315, the device may perform wireless communication with a second device in a wireless communication system using the modified analog beamforming codebook. The operations of 1315 may be performed according to the methods described herein. In some examples, aspects of the operations of 1315 may be performed by a link component as described with reference to FIGS. 5 through 8.

FIG. 14 shows a flowchart illustrating a method 1400 that supports techniques for transformation of analog beamforming codebooks in accordance with various aspects of the present disclosure. The operations of method 1400 may be implemented by a device (e.g., a base station 105, a UE 115) or its components as described herein. For example, the operations of method 1400 may be performed by a communications manager as described with reference to FIGS. 5 through 8. In some examples, a device may execute a set of instructions to control the functional elements of the device to perform the functions described below. Additionally, or alternatively, a device may perform aspects of the functions described below using special-purpose hardware.

At 1405, the device may modify an analog beamforming codebook based on a covariance matrix associated with interference and noise in a wireless communication system. The operations of 1405 may be performed according to the methods described herein. In some examples, aspects of the operations of 1405 may be performed by a codebook component as described with reference to FIGS. 5 through 8.

At 1410, the device may determine, based on a beam procedure, an uplink directional beam pair or a downlink directional beam pair for wireless communication using the modified analog beamforming codebook. The operations of 1410 may be performed according to the methods described herein. In some examples, aspects of the operations of 1410 may be performed by a beam component as described with reference to FIGS. 5 through 8.

At 1415, the device may perform the wireless communication with a second device in the wireless communication system based on the determined uplink directional beam pair or the determined downlink directional beam pair. The operations of 1415 may be performed according to the methods described herein. In some examples, aspects of the operations of 1415 may be performed by a beam component as described with reference to FIGS. 5 through 8.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a first device in a wireless communication system, comprising: modifying an analog beamforming codebook based at least in part on a covariance matrix associated with interference and noise in the wireless communication system; and performing the wireless communication with a second device in the wireless communication system using the modified analog beamforming codebook.

Aspect 2: The method of aspect 1, further comprising: estimating the covariance matrix based at least in part on a set of resources, wherein modifying the analog beamforming codebook comprises: modifying the analog beamforming codebook based at least in part on the estimated covariance matrix.

Aspect 3: The method of aspect 2, further comprising: determining the set of resources based at least in part on an example, wherein estimating the covariance matrix comprises: estimating the covariance matrix based at least in part on measuring an interference and noise level due to simultaneous wireless communications from a group of devices including a third device using the determined set of resources.

Aspect 4: The method of any of aspects 2 through 3, wherein modifying the analog beamforming codebook comprises: rotating the analog beamforming codebook based at least in part on the estimated covariance matrix.

Aspect 5: The method of any of aspects 2 through 4, wherein modifying the analog beamforming codebook comprises: scaling one or more beam weights associated with the analog beamforming codebook based at least in part on the estimated covariance matrix.

Aspect 6: The method of any of aspects 1 through 5, further comprising: determining a condition to modify the analog beamforming codebook, wherein modifying the analog beamforming codebook is based at least in part on the determined condition.

Aspect 7: The method of aspect 6, wherein determining the condition comprises: determining a signal-to-interference-plus-noise-ratio based at least in part on measuring an interference and noise level from a group of devices including a third device, wherein modifying the analog beamforming codebook is based at least in part on the determined signal-to-interference-plus-noise-ratio satisfying a threshold.

Aspect 8: The method of any of aspects 6 through 7, wherein determining the condition comprises: determining an uplink data rate or a downlink data rate, or both, based at least in part on measuring an interference and noise level from a group of devices including a third device, wherein modifying the analog beamforming codebook is based at least in part on the determined uplink data rate or the determined downlink data rate, or both, satisfying a threshold.

Aspect 9: The method of any of aspects 6 through 8, wherein determining the condition comprises: determining geographical position information associated with one or more other devices, wherein modifying the analog beamforming codebook is based at least in part on the determined geographical position information associated with the one or more other devices.

Aspect 10: The method of any of aspects 6 through 9, wherein determining the condition comprises: determining a tunable parameter associated with the analog beamforming codebook based at least in part on one or more device resources associated with the first device, wherein modifying the analog beamforming codebook is based at least in part on the determined tunable parameter satisfying a threshold.

Aspect 11: The method of any of aspects 1 through 10, further comprising: storing or loading the modified analog beamforming codebook in a memory of a radio-frequency integrated circuit of the first device.

Aspect 12: The method of any of aspects 1 through 11, further comprising: determining, based at least in part on a beam procedure, an uplink directional beam pair or a downlink directional beam pair for the wireless communication using the modified analog beamforming codebook, wherein performing the wireless communication comprises: performing the wireless communication with the second device in the wireless communication system based at least in part on the determined uplink directional beam pair or the determined downlink directional beam pair.

Aspect 13: The method of aspect 12, further comprising: determining a channel quality between the first device and the second device based at last in part on one or more reference signals, wherein determining the uplink directional beam pair or the downlink directional beam pair comprises: determining, based at least in part on the determined channel quality, the uplink directional beam pair or the downlink directional beam pair for the wireless communication using the modified analog beamforming codebook.

Aspect 14: The method of aspect 13, wherein the one or more reference signals comprises a SSB, a CSI-RS, or a SRS, or a combination thereof.

Aspect 15: The method of any of aspects 12 through 14, wherein the uplink directional beam pair is different from the downlink directional beam pair.

Aspect 16: The method of any of aspects 12 through 15, further comprising: determining an uplink directional beam pair or a downlink directional beam pair for the wireless communication using the modified analog beamforming codebook based at least in part on a rate improvement parameter, a power consumption parameter, a computational complexity and a thermal overhead associated with transforming operations, one or more latencies and overheads incurred in separate beam training for uplink and downlink, or a combination thereof.

Aspect 17: The method of any of aspects 1 through 16, wherein performing the wireless communication comprises: performing the wireless communication with the second device in the wireless communication system based at least in part on signaling comprising an indication of an uplink directional beam pair or a downlink directional beam pair, or both.

Aspect 18: The method of aspect 17, wherein the signaling comprises an RRC message.

Aspect 19: The method of any of aspects 17 through 18, wherein the signaling comprises a DCI message.

Aspect 20: The method of any of aspects 17 through 19, wherein the signaling comprises a (MAC-CE) message.

Aspect 21: The method of any of aspects 1 through 20, wherein the first device or the second device, or both, comprise a UE, a CPE, a base station, a relay device, a repeater device with a capability corresponding to a number of messages repeated at the device, or a transmission-reception point, or a combination thereof.

Aspect 22: An apparatus for wireless communication at a first device in a wireless communication system, comprising a processor; memory coupled with the processor; and instructions stored in the memory and executable by the processor to cause the apparatus to perform a method of any of aspects 1 through 21.

Aspect 23: An apparatus for wireless communication at a first device in a wireless communication system, comprising at least one means for performing a method of any of aspects 1 through 21.

Aspect 24: A non-transitory computer-readable medium storing code for wireless communication at a first device in a wireless communication system, the code comprising instructions executable by a processor to perform a method of any of aspects 1 through 21.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a first device in a wireless communication system, comprising:
    modifying, at the first device and in accordance with a transform operation, an analog beamforming codebook based at least in part on a covariance matrix associated with interference and noise in the wireless communication system, wherein the covariance matrix is a single covariance matrix that is estimated at the first device based at least in part on one or more interference and noise measurements made at the first device;
    determining an uplink directional beam pair or a downlink directional beam pair based at least in part on a computational complexity and a thermal overhead associated with the transform operation; and
    transmitting, from the first device, one or more wireless communications to a second device in the wireless communication system via the uplink directional beam pair or the downlink directional beam pair using the modified analog beamforming codebook.

2. The method of claim 1, further comprising:
estimating the covariance matrix based at least in part on a set of resources, wherein modifying the analog beamforming codebook comprises:
    modifying the analog beamforming codebook based at least in part on the estimated covariance matrix.

3. The method of claim 2, further comprising:
determining the set of resources based at least in part on a configuration, wherein estimating the covariance matrix comprises:
    estimating the covariance matrix based at least in part on measuring an interference and noise level due to simultaneous wireless communications from a group of devices including a third device using the determined set of resources.

4. The method of claim 2, wherein modifying the analog beamforming codebook comprises:
    rotating the analog beamforming codebook based at least in part on the estimated covariance matrix; and
    scaling one or more beam weights associated with the analog beamforming codebook based at least in part on the estimated covariance matrix.

5. The method of claim 1, further comprising:
determining a condition to modify the analog beamforming codebook, wherein modifying the analog beamforming codebook is based at least in part on the determined condition.

6. The method of claim 5, wherein determining the condition comprises:
    determining a signal-to-interference-plus-noise-ratio based at least in part on measuring an interference and noise level from a group of devices including a third device, wherein modifying the analog beamforming codebook is based at least in part on the determined signal-to-interference-plus-noise-ratio satisfying a threshold.

7. The method of claim 5, wherein determining the condition comprises:
    determining an uplink data rate or a downlink data rate, or both, based at least in part on measuring an interference and noise level from a group of devices including a third device, wherein modifying the analog beamforming codebook is based at least in part on the determined uplink data rate or the determined downlink data rate, or both, satisfying a threshold.

8. The method of claim 5, wherein determining the condition comprises:
    determining geographical position information associated with one or more other devices, wherein modifying the analog beamforming codebook is based at least in part on the determined geographical position information associated with the one or more other devices.

9. The method of claim 5, wherein determining the condition comprises:
    determining a tunable parameter associated with the analog beamforming codebook based at least in part on one or more device resources associated with the first device, wherein modifying the analog beamforming codebook is based at least in part on the determined tunable parameter satisfying a threshold.

10. The method of claim 1, further comprising:
    storing or loading the modified analog beamforming codebook in a memory of a radio-frequency integrated circuit of the first device.

11. The method of claim 1, further comprising:

determining, based at least in part on a beam operation, the uplink directional beam pair or the downlink directional beam pair for the wireless communication using the modified analog beamforming codebook, wherein the uplink directional beam pair is different from the downlink directional beam pair, wherein transmitting the one or more wireless communications comprises: transmitting the one or more wireless communications to the second device in the wireless communication system based at least in part on the determined uplink directional beam pair or the determined downlink directional beam pair.

12. The method of claim 11, further comprising:

determining a channel quality between the first device and the second device based at least in part on one or more reference signals, wherein the one or more reference signals comprises a synchronization signal block, a channel state information reference signal, or a sounding reference signal, or a combination thereof, wherein determining the uplink directional beam pair or the downlink directional beam pair comprises:

determining, based at least in part on the determined channel quality, the uplink directional beam pair or the downlink directional beam pair for the wireless communication using the modified analog beamforming codebook.

13. The method of claim 1, wherein determining the uplink directional beam pair or the downlink directional beam pair further comprises:

determining the uplink directional beam pair or the downlink directional beam pair for the wireless communication using the modified analog beamforming codebook based at least in part on a rate improvement parameter, a power consumption parameter, the computational complexity and the thermal overhead associated with transforming operations, one or more latencies and overheads incurred in separate beam training for uplink and downlink, or a combination thereof.

14. The method of claim 1, wherein transmitting the one or more wireless communications comprises:

transmitting the one or more wireless communications to the second device in the wireless communication system based at least in part on signaling including an indication of the uplink directional beam pair or the downlink directional beam pair, or both, wherein the signaling comprises a radio resource control message, a downlink control information message, or a medium access control-control element message, or a combination thereof.

15. A first apparatus for wireless communication in a wireless communication system, comprising:

one or more processors, one or more memories coupled with the one or more processors; and instructions stored in the one or more memories and executable by the one or more processors to cause the first apparatus to:

modify, at the first apparatus and in accordance with a transform operation, an analog beamforming codebook based at least in part on a covariance matrix associated with interference and noise in the wireless communication system, wherein the covariance matrix is a single covariance matrix that is estimated at the first apparatus based at least in part on one or more interference and noise measurements made at the first apparatus;

determine an uplink directional beam pair or a downlink directional beam pair based at least in part on a computational complexity and a thermal overhead associated with the transform operation; and transmit, from the first apparatus, one or more wireless communications to perform the wireless communication with a second apparatus in the wireless communication system via the uplink directional beam pair or the downlink directional beam pair using the modified analog beamforming codebook.

16. The first apparatus of claim 15, wherein the instructions are further executable by the one or more processors to cause the first apparatus to:

estimate the covariance matrix based at least in part on a set of resources, wherein, to modify the analog beamforming codebook, the instructions are further executable by the processor to cause the first apparatus to:

modify the analog beamforming codebook based at least in part on the estimated covariance matrix.

17. The first apparatus of claim 16, wherein the instructions are further executable by the one or more processors to cause the first apparatus to:

determine the set of resources based at least in part on a configuration, wherein, to estimate the covariance matrix, the instructions are further executable by the processor to cause the first apparatus to:

estimate the covariance matrix based at least in part on measuring an interference and noise level due to simultaneous wireless communications from a group of apparatuses including a third apparatus using the determined set of resources.

18. The first apparatus of claim 16, wherein the instructions to modify the analog beamforming codebook are executable by the one or more processors to cause the first apparatus to:

rotate the analog beamforming codebook based at least in part on the estimated covariance matrix; and scale one or more beam weights associated with the analog beamforming codebook based at least in part on the estimated covariance matrix.

19. The first apparatus of claim 15, wherein the instructions are further executable by the one or more processors to cause the first apparatus to:

determine a condition to modify the analog beamforming codebook, wherein to modify the analog beamforming codebook is based at least in part on the determined condition.

20. The first apparatus of claim 19, wherein the instructions to determine the condition are executable by the one or more processors to cause the first apparatus to:

determine a signal-to-interference-plus-noise-ratio based at least in part on measuring an interference and noise level from a group of apparatuses including a third apparatus, wherein to modify the analog beamforming codebook is based at least in part on the determined signal-to-interference-plus-noise-ratio satisfying a threshold.

21. The first apparatus of claim 19, wherein the instructions to determine the condition are executable by the one or more processors to cause the first apparatus to:

determine an uplink data rate or a downlink data rate, or both, based at least in part on measuring an interference and noise level from a group of apparatuses including a third apparatus, wherein to modify the analog beamforming codebook is based at least in part on the determined uplink data rate or the determined downlink data rate, or both, satisfying a threshold.

22. The first apparatus of claim 19, wherein the instructions to determine the condition are executable by the one or more processors to cause the first apparatus to:

determine geographical position information associated with one or more other apparatuses, wherein to modify the analog beamforming codebook is based at least in part on the determined geographical position information associated with the one or more other apparatuses.

23. The first apparatus of claim 19, wherein the instructions to determine the condition are executable by the one or more processors to cause the first apparatus to:

determine a tunable parameter associated with the analog beamforming codebook based at least in part on one or more apparatus resources associated with the first apparatus, wherein to modify the analog beamforming codebook is based at least in part on the determined tunable parameter satisfying a threshold.

24. The first apparatus of claim 15, wherein the instructions are further executable by the one or more processors to cause the first apparatus to:

store or loading the modified analog beamforming codebook in a memory of a radio-frequency integrated circuit of the first apparatus.

25. The first apparatus of claim 15, wherein the instructions are further executable by the one or more processors to cause the first apparatus to:

determine, based at least in part on a beam operation, the uplink directional beam pair or the downlink directional beam pair for the wireless communication using the modified analog beamforming codebook, wherein the uplink directional beam pair is different from the downlink directional beam pair, wherein, to perform the wireless communication, the instructions are further executable by the processor to cause the first apparatus to:

perform the wireless communication with the second apparatus in the wireless communication system based at least in part on the determined uplink directional beam pair or the determined downlink directional beam pair.

26. The first apparatus of claim 25, wherein the instructions are further executable by the one or more processors to cause the first apparatus to:

determine a channel quality between the first apparatus and the second apparatus based at least in part on one or more reference signals, wherein the one or more reference signals comprises a synchronization signal block, a channel state information reference signal, or a sounding reference signal, or a combination thereof, wherein, to determine the uplink directional beam pair or the downlink directional beam pair, the instructions are further executable by the processor to cause the first apparatus to:

determine, based at least in part on the determined channel quality, the uplink directional beam pair or the downlink directional beam pair for the wireless communication using the modified analog beamforming codebook.

27. The first apparatus of claim 15, wherein to determine the uplink directional beam pair or the downlink directional beam pair, the instructions are further executable by the one or more processors to cause the first apparatus to:

determine the uplink directional beam pair or the downlink directional beam pair for the wireless communication using the modified analog beamforming codebook based at least in part on a rate improvement parameter, a power consumption parameter, the computational complexity and the thermal overhead associated with transforming operations, one or more latencies and overheads incurred in separate beam training for uplink and downlink, or a combination thereof.

28. The first apparatus of claim 15, wherein the instructions to perform the wireless communication are executable by the one or more processors to cause the first apparatus to:

transmit the one or more wireless communications to the second apparatus in the wireless communication system based at least in part on signaling comprising an indication of the uplink directional beam pair or the downlink directional beam pair, or both, wherein the signaling comprises a radio resource control message, a downlink control information message, or a medium access control-control element message or a combination thereof.

29. A first apparatus for wireless communication in a wireless communication system, comprising:

means for modifying, at the first apparatus and in accordance with a transform operation, an analog beamforming codebook based at least in part on a covariance matrix associated with interference and noise in the wireless communication system, wherein the covariance matrix is a single covariance matrix that is estimated at the first apparatus based at least in part on one or more interference and noise measurements made at the first apparatus;

means for determining an uplink directional beam pair or a downlink directional beam pair based at least in part on a computational complexity and a thermal overhead associated with the transform operation; and means for transmitting, from the first apparatus, one or more wireless communications to a second apparatus in the wireless communication system via the uplink directional beam pair or the downlink directional beam pair using the modified analog beamforming codebook.

30. A non-transitory computer-readable medium storing code for wireless communication at a first device in a wireless communication system, the code comprising instructions executable by one or more processors to:

modify, at the first device and in accordance with a transform operation, an analog beamforming codebook based at least in part on a covariance matrix associated with interference and noise in the wireless communication system, wherein the covariance matrix is a single covariance matrix that is estimated at the first device based at least in part on one or more interference and noise measurements made at the first device;

determine an uplink directional beam pair or a downlink directional beam pair based at least in part on a computational complexity and a thermal overhead associated with the transform operation; and transmit, from the first device, one or more wireless communications to a second device in the wireless communication system via the uplink directional beam pair or the downlink directional beam pair using the modified analog beamforming codebook.

* * * * *